(12) United States Patent
Liu et al.

(10) Patent No.: US 11,992,893 B2
(45) Date of Patent: May 28, 2024

(54) ELECTRODE DISASSEMBLY DEVICE FOR SPOT WELDING

(71) Applicant: KYOKUTOH CHINA CO., LTD, Guangdong (CN)

(72) Inventors: Junliang Liu, Guangdong (CN); Xiande Yang, Guangdong (CN)

(73) Assignee: KYOKUTOH CHINA CO., LTD., Guangdong (CN)

( * ) Notice: Subject to any disclaimer, the term of this patent is extended or adjusted under 35 U.S.C. 154(b) by 186 days.

(21) Appl. No.: 17/188,366

(22) Filed: Mar. 1, 2021

(65) Prior Publication Data
US 2021/0178508 A1 Jun. 17, 2021

Related U.S. Application Data

(63) Continuation of application No. PCT/CN2019/093459, filed on Jun. 28, 2019.

(30) Foreign Application Priority Data

Mar. 25, 2019 (CN) .......................... 201910226222.8

(51) Int. Cl.
*B23K 11/30* (2006.01)
*B23P 19/04* (2006.01)

(52) U.S. Cl.
CPC .......... *B23K 11/3072* (2013.01); *B23P 19/04* (2013.01)

(58) Field of Classification Search
CPC ..... B23K 11/30; B23K 11/3072; B23K 11/36; B23P 19/04; B23Q 2003/155418; B23Q 2003/155432
See application file for complete search history.

(56) References Cited

U.S. PATENT DOCUMENTS 6,188,038 B1* 2/2001 Kazuhiro ........... B23K 11/3072
219/86.25
9,505,080 B2 11/2016 Nakajima
(Continued)

FOREIGN PATENT DOCUMENTS

CN 104259642 A 1/2015
CN 104981320 A 10/2015
(Continued)

OTHER PUBLICATIONS

Translation of CN-108972446-A (Year: 2018).*
(Continued)

*Primary Examiner* — Matthew P Travers
(74) *Attorney, Agent, or Firm* — Renner, Otto, Boisselle & Sklar, LLP

(57) ABSTRACT

When a drive unit 5 drives to rotate a first rotator 6 and a second rotator 7 relative to one another in a first relative positional relationship R1 toward one side, graspers 8 turn toward the one side to cause respective pawl portions 8c to advance into a detachment operation space S1 such that the pawl portions 8c can contact an electrode 10 set in the detachment operation space S1, and when the drive unit drives to rotate the first rotator 6 and the second rotator 7 relative to one another in a second relative positional relationship R2 toward another side, the graspers 8 turn toward the other side to cause the respective pawl portions 8c to advance into the detachment operation space S1 such that the pawl portions 8c can contact an electrode 10 set in the detachment operation space S1.

3 Claims, 22 Drawing Sheets

(56) References Cited

U.S. PATENT DOCUMENTS

| | | | |
|---|---|---|---|
| 2014/0291299 A1* | 10/2014 | Ishikawa | B23K 11/115 |
| | | | 219/86.8 |
| 2015/0217397 A1 | 8/2015 | Nakajima | |
| 2017/0232546 A1 | 8/2017 | Marakkala Manage | |
| 2017/0291250 A1* | 10/2017 | Huynh | B23K 11/3072 |
| 2018/0099348 A1* | 4/2018 | Choi | B23K 37/0241 |
| 2018/0264582 A1* | 9/2018 | Tedeschi | B23K 11/115 |

FOREIGN PATENT DOCUMENTS

| | | | |
|---|---|---|---|
| CN | 206139976 U | | 5/2017 |
| CN | 107107245 A | | 8/2017 |
| CN | 108188705 A | | 6/2018 |
| CN | 108340065 A | | 7/2018 |
| CN | 108972446 A | * | 12/2018 |
| DE | 10 2014 209828 A1 | | 11/2015 |
| DE | 102015103791 A1 | | 9/2016 |
| JP | 3 073967 B2 | | 8/2000 |
| JP | 2003200271 A | | 7/2003 |
| KR | 101692981 B1 | | 1/2017 |
| WO | 2015/118573 A1 | | 8/2015 |

OTHER PUBLICATIONS

International Search Report for related Application No. PCT/CN2019/093459, mailed Sep. 30, 2019.

Extended European Search Report for corresponding EP Application No. 19857416.2 dated Nov. 4, 2021.

Office Action for corresponding CN Application No. 201980055647.5 dated Feb. 7, 2022, with English language translation.

* cited by examiner

ELECTRODE DISASSEMBLY DEVICE FOR SPOT WELDING

CROSS-REFERENCE TO RELATED APPLICATIONS

This application is a continuation of International Application No. PCT/CN2019/093459, filed on Jun. 28, 2019, which claims priority from Chinese Patent Application No. 201821443725.8 filed on Sep. 4, 2018 and Chinese Patent Application No. 201910226222.8 filed on Mar. 25, 2019, each of which is incorporated herein by reference in its entirety and for all purposes.

TECHNICAL FIELD

The present disclosure relates to an electrode disassembly device for spot welding for use in automobile production lines, for example.

BACKGROUND OF THE DISCLOSURE

Conventionally, in a welding gun of spot welding, rod-shaped shanks are screwed to be coupled to a gun body, and electrodes applying pressure and conducting electricity to welding workpieces are fitted to be attached to respective distal ends of the shanks. The electrodes of spot welding need regular replacement to achieve quality stabilization of welding. In replacement operations, since the electrode is firmly fitted onto the distal end of the shank, the electrode is generally detached from the distal end of the shank while being rotated about its central axis by using an electrode disassembly device.

In detachment operations of the electrode, when the electrode is rotated in a direction of unscrewing the shank out of the gun body, the shank may be detached from the gun body without detaching the electrode from the shank. Thus, in a welding gun in which a pair of opposing electrodes sandwich welding workpieces to perform spot welding, when the electrodes are detached from respective distal ends of shanks by using an electrode disassembly device having a detachment mechanism part that only rotates in one direction, the detachment operations of the electrodes need to be in succession performed while changing a position of the welding gun or the electrode disassembly device with respect to the electrode so as to bring a rotation direction of the detachment mechanism part of the electrode disassembly device in alignment with a direction of screwing the shank into the gun body to prevent the shanks from being detached from the gun body. This results in a problem of taking much time for the detachment operations of the electrodes.

To avoid the problem, for example, an electrode disassembly device disclosed in International Patent Publication No. WO2015/118573 has a structure that does not need to greatly change positions of a welding gun and the electrode disassembly device when the detachment operations of a pair of opposing electrodes are performed. Specifically, the electrode disassembly device of WO2015/118573 includes annular first and second rotators having an axis of rotation located at a center of a detachment operation space and being capable of rotating relative to one another, and the second rotator is disposed inwardly of the first rotator. Three first notched recesses are formed in a half portion of an inner circumferential surface of the first rotator on one opening side of the first rotator along a circumferential direction about the axis of rotation at equal intervals. Each of the first notched recesses is formed to have a bottom portion becoming increasingly shallower toward a reverse direction of the first rotator. In contrast, three second notched recesses are formed in a half portion of the inner circumferential surface of the first rotator on another opening side of the first rotator along the circumferential direction about the axis of rotation at equal intervals. Each of the second notched recesses is formed to have a bottom portion becoming increasingly shallower toward a forward direction of the first rotator. A first roller housing that accommodates a first roller serving as a grasper to be rotatable and to be prevented from falling off is formed at locations of the second rotator corresponding to the first notched recesses. A second roller housing that accommodates a second roller serving as a grasper to be rotatable and to be prevented from falling off is formed at locations of the second rotator corresponding to the second notched recesses. The first and second rollers are configured to be movable in a radial direction of the second rotator in the first and second roller housings, respectively. Then, when the first rotator is rotated relative to the second rotator in the forward direction with one electrode being set among the first rollers in the electrode detachment space, the first rollers move along the respective first notched recesses and are pressed by the respective first notched recesses to thereby move toward the detachment operation space to grasp the electrode. The first rotator is then further rotated in the forward direction to turn the electrode together with the second rotator and thereby detach the electrode from a distal end of a shank. After that, when the first rotator is rotated relative to the second rotator in the reverse direction with another electrode being set among the second rollers in the electrode detachment space, the second rollers move along the respective second notched recesses and are pressed by the respective second notched recesses to thereby move toward the detachment operation space to grasp the electrode. The first rotator is then further rotated in the reverse direction to turn the electrode together with the second rotator and thereby detach the electrode from a distal end of a shank. In the electrode disassembly device of WO2015/118573, the pair of electrodes thus can be detached in succession from the welding gun without greatly changing the positions of the welding gun and the electrode disassembly device.

SUMMARY

In this respect, the electrode disassembly device of WO2015/118573 needs a larger space for installation since a set of the graspers composed of the first rollers and a set of the graspers composed of the second rollers are spaced apart along the axis of rotation and thus the device increases in size along the direction of the axis of rotation.

Then, a dedicated set of the graspers are necessary for each of electrodes to be detached, thus causing problems not only of having more components and a complex structure but also of being higher cost.

The present disclosure is made in view of the foregoing and an object of the present disclosure is to provide an electrode disassembly device for spot welding that is compact and devoid of a complex structure, as well as enables lower cost.

To achieve the object, the present disclosure is characterized by devising such that electrodes can be detached by one set of graspers of which the graspers are arranged in one line in a circular manner around an axis of rotation, even when first and second rotators are rotated in each of two directions, one side and another.

Specifically, the present disclosure is directed to an electrode disassembly device for spot welding for detaching an electrode held on a distal end of a shank of a gun for spot welding, from the distal end of the shank. The following solutions are then applied.

According to a first aspect of the present disclosure, the electrode disassembly device includes a first rotator having an axis of rotation located at a center of a detachment operation space, the first rotator including a plurality of fitting portions at equal intervals around the axis of rotation; a second rotator configured to be rotatable relative to one another with respect to the first rotator around the axis of rotation; a drive unit configured to drive to rotate at least one of the first rotator and the second rotator; and a plurality of graspers disposed at locations corresponding to the respective fitting portions, and supported on the second rotator pivotally and rotatably around a shaft extending in a same direction as the axis of rotation, the plurality of graspers each having a distal end portion including a pawl portion, and a base portion configured to be loosely fitted into a corresponding fitting portion; wherein when the drive unit drives to rotate the first rotator and the second rotator relative to one another in a first relative positional relationship toward one side, the fitting portions press the respective base portions toward the one side and thereby the graspers turn toward the one side to cause the respective pawl portions to advance into the detachment operation space such that the pawl portions can contact the electrode set in the detachment operation space, and when the drive unit drives to rotate the first rotator and the second rotator relative to one another in a second relative positional relationship toward another side, the fitting portions press the respective base portions toward the other side and thereby the graspers turn toward the other side to cause the respective pawl portions to advance into the detachment operation space such that the pawl portions can contact the electrode set in the detachment operation space.

According to a second aspect of the present disclosure in relation to the first aspect, the first relative positional relationship and the second relative positional relationship are relative positional relationships in which positional relationships between the first rotator and the second rotator differ, and the pawl portion includes one pawl portion formed in the grasper, and is configured such that when the first rotator and the second rotator are rotated relative to one another toward the one side to shift the first rotator from the first relative positional relationship to the second relative positional relationship, the graspers turn toward the one side to cause the respective pawl portions to advance into the detachment operation space and then to retract from the detachment operation space, and when the first rotator and the second rotator are rotated relative to one another toward the other side to shift the first rotator from the second relative positional relationship to the first relative positional relationship, the graspers turn toward the other side to cause the respective pawl portions to advance into the detachment operation space and then to retract from the detachment operation space.

According to a third aspect of the present disclosure in relation to the first aspect, the first relative positional relationship and the second relative positional relationship are relative positional relationships in which positional relationships between the first rotator and the second rotator are same, and the pawl portion includes a pair of pawl portions spaced apart in a circumferential direction about the axis of rotation, and is configured such that when the first rotator and the second rotator are rotated relative to one another in the relative positional relationships toward the one side, the graspers turn toward the one side to cause one of the pair of pawl portions to advance into the detachment operation space, and when the first rotator and the second rotator are rotated relative to one another in the relative positional relationships toward the other side, the graspers turn toward the other side to cause another of the pair of pawl portions to advance into the detachment operation space.

According to a fourth aspect of the present disclosure in relation to any of the first to third aspects, the drive unit includes a first fluid pressure cylinder including a first piston rod having a distal end connected to the first rotator, the first fluid pressure cylinder configured to rotate the first rotator toward the one side by extending the first piston rod and to rotate the first rotator toward the other side by retracting the first piston rod; and a brake mechanism including a brake body movable along the axis of rotation and an urging means configured to urge the brake body toward the second rotator to bring the brake body in sliding contact with the second rotator.

According to a fifth aspect of the present disclosure in relation to the fourth aspect, the second rotator includes an extension portion extending laterally outwardly, and a detection sensor capable of detecting the extension portion is provided laterally outwardly of the second rotator, and the second rotator is configured such that the extension portion is located to correspond to the detection sensor in the state where the first rotator and the second rotator are in the first relative positional relationship and the second relative positional relationship, and the extension portion is located not to correspond to the detection sensor in the state where the electrode has been detached from the distal end of the shank by rotating the second rotator toward the one side or the other side.

According to a sixth aspect of the present disclosure in relation to any of the first to third aspects, the drive unit includes a first fluid pressure cylinder including a first piston rod having a distal end connected to the first rotator, the first fluid pressure cylinder configured to rotate the first rotator toward the one side by extending the first piston rod and to rotate the first rotator toward the other side by retracting the first piston rod; and a second fluid pressure cylinder including a second piston rod having a distal end connected to the second rotator, the second fluid pressure cylinder having force of extension and retraction smaller than that of the first fluid pressure cylinder, the second fluid pressure cylinder configured to rotate the second rotator toward the one side by retracting the second piston rod and to rotate the second rotator toward the other side by extending the second piston rod, and when the first rotator and the second rotator are rotated relative to one another toward the one side, the first fluid pressure cylinder and the second fluid pressure cylinder are configured to be actuated to extend both the first piston rod and the second piston rod, and when the first rotator and the second rotator are rotated relative to one another toward the other side, the first fluid pressure cylinder and the second fluid pressure cylinder are configured to be actuated to retract both the first piston rod and the second piston rod.

In the first aspect of the present disclosure, after the electrode held on the distal end of the shank is set in the detachment operation space with the first and second rotators being in the first relative positional relationship, when the first and second rotators are rotated relative to one another toward the one side, the pawl portions of the graspers advance into the detachment operation space to grasp the electrode. When the first rotator is, in that state, rotated further toward the one side, the second rotator is together rotated toward the one side to twist the electrode on the distal end of the shank to detach the electrode from the distal end of the shank. In contrast, after the electrode held on the distal end of the shank is set in the detachment operation space with the first and second rotators being in the second relative positional relationship, when the first and second rotators are rotated relative to one another toward the other side, the pawl portions of the graspers advance into the detachment operation space to grasp the electrode. When the first rotator is, in that state, rotated further toward the other side, the second rotator is together rotated toward the other side to twist the electrode on the distal end of the shank to detach the electrode from the distal end of the shank. Thus, even when the electrode is rotated in each of two directions, the one side and the other, on the shank, the electrode can be detached from the shank. Accordingly, since a direction of rotation of the electrode on the shank is determined to be opposite to a direction of attachment of the shank to the gun body in detachment operations of the electrode, for example, unintentional detachment of the shank from the gun body can be avoided. Then, the plurality of the graspers for detaching the electrode are only arranged in one line around the axis of rotation and there are no sets of the plurality of the graspers provided along a direction of the axis of rotation as in WO2015/118573, enabling the device to become compact along the direction of the axis of rotation. Further, the device includes only one set of the graspers where the plurality of the graspers are arranged in one line along the circumferential direction about the axis of rotation, and does not include electrode grasping parts provided in a dedicated manner for each electrode to be detached as in WO2015/118573, enabling reduced number of components to have a simpler structure, and lowered cost of the components.

In the second aspect of the present disclosure, the one pawl portion provided in the grasper can be used to grasp the electrode not only when the first and second rotators are rotated toward the one side, but also when the first and second rotators are rotated toward the other side. Thus, the graspers can have a simpler structure and cost of the components can be reduced.

In the third aspect of the present disclosure, when the first and second rotators are rotated toward the one side to detach the electrode from the distal end of the shank and toward the other side to detach the electrode from the distal end of the shank, the electrodes are grasped by the different pawl portions of one grasper. Thus, the load applied to each of the pawl portions of the grasper when the detachment operations for the electrode are repeated can be the half, resulting in the device less susceptible to breakage of the pawl portions.

In the fourth aspect of the present disclosure, the second rotator is harder to rotate around the axis of rotation than the first rotator due to the urging force of the urging means applied to the second rotator in the direction of the axis of rotation. Thus, while the first rotator is rotated relative to the second rotator toward the one side when the first piston rod extends, the first rotator is rotated relative to the second rotator toward the other side when the first piston rod retracts. The first and second rotators thus can be rotated relative to one another by one driving source to enable the graspers to turn to perform grasp and release of the electrode, thus resulting in the device less costly.

In the fifth aspect of the present disclosure, when the second rotator is rotated together with the first rotator toward the one side, the electrode is twisted on the distal end of the shank toward the one side to be detached from the distal end of the shank and the extension portion is located not to correspond to the detection sensor. In contrast, when the second rotator is rotated together with the first rotator toward the other side, the electrode is twisted on the distal end of the shank toward the other side to be detached from the distal end of the shank and the extension portion is located not to correspond to the detection sensor. Accordingly, regardless of the rotation directions of the electrode on the distal end of the shank, the detachment of the electrode from the distal end of the shank can be sensed from whether the detection sensor detects the extension portion or not.

In the sixth aspect of the present disclosure, since the first and second piston rods each extend and retract to thereby rotate the first and second rotators relative to one another, the graspers can turn to perform grasp and release of the electrode. For detaching the electrode from the shank, when the first and second piston rods both extend or retract in the state where the electrode is set in the detachment operation space, the first and second rotators are subjected to relative force in a rotation direction to cause the graspers to grasp the electrode, and since the force of the extension and retraction of the second piston rod is smaller than that of the first piston rod, the first piston rod extends or retracts to overcome the force of the extension or retraction of the second piston rod. Thus, the first and second rotators are rotated in an integrated manner with the electrode being firmly grasped by the graspers, enabling ensured detachment of the electrode from the distal end of the shank. Accordingly, the relative and integrated rotation of the first and the second rotators can only be performed by extending and retracting the piston rods of the two fluid pressure cylinders. This enables the device to be constructed from less costly components and cost of the device can be further lowered.

DETAILED DESCRIPTION

Embodiments of the present disclosure are described in detail below with reference to the drawings. It is noted that the following description of preferred embodiments is merely an example in nature.

First Embodiment of Disclosure

Figure 1:
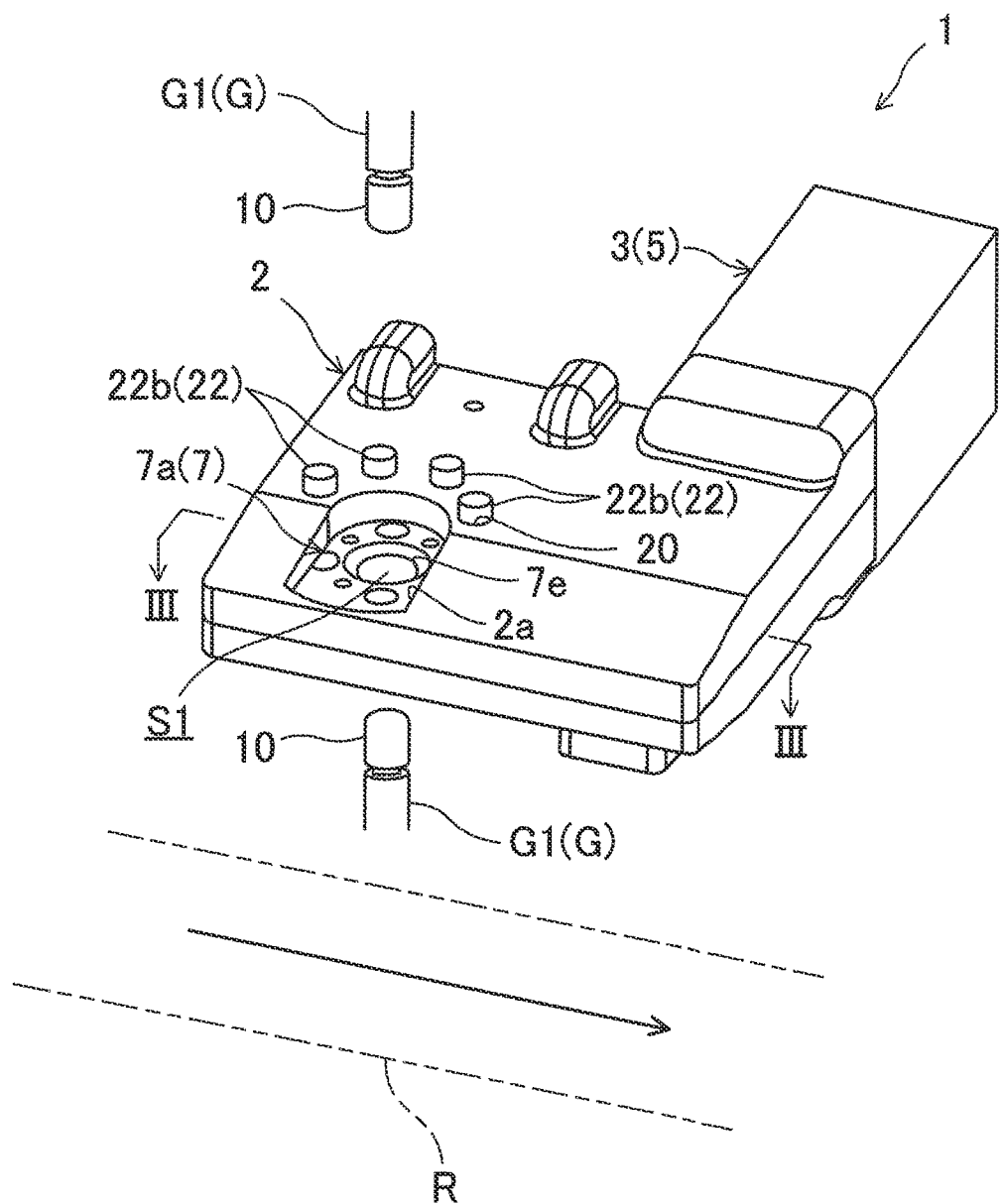
FIG. 1 is a perspective view of an electrode disassembly device for spot welding according to a first embodiment of the present disclosure.

FIG. 1 illustrates an electrode disassembly device 1 for spot welding, according to a first embodiment of the present disclosure. The electrode disassembly device 1 is placed lateral to a transfer passage R of an automobile production line and configured to perform electrode detachment operations to detach electrodes 10 that are held on distal ends of a pair of opposing shanks G1 in a welding gun G of spot welding attached to a distal end of an arm of an industrial robot.

Figure 2:
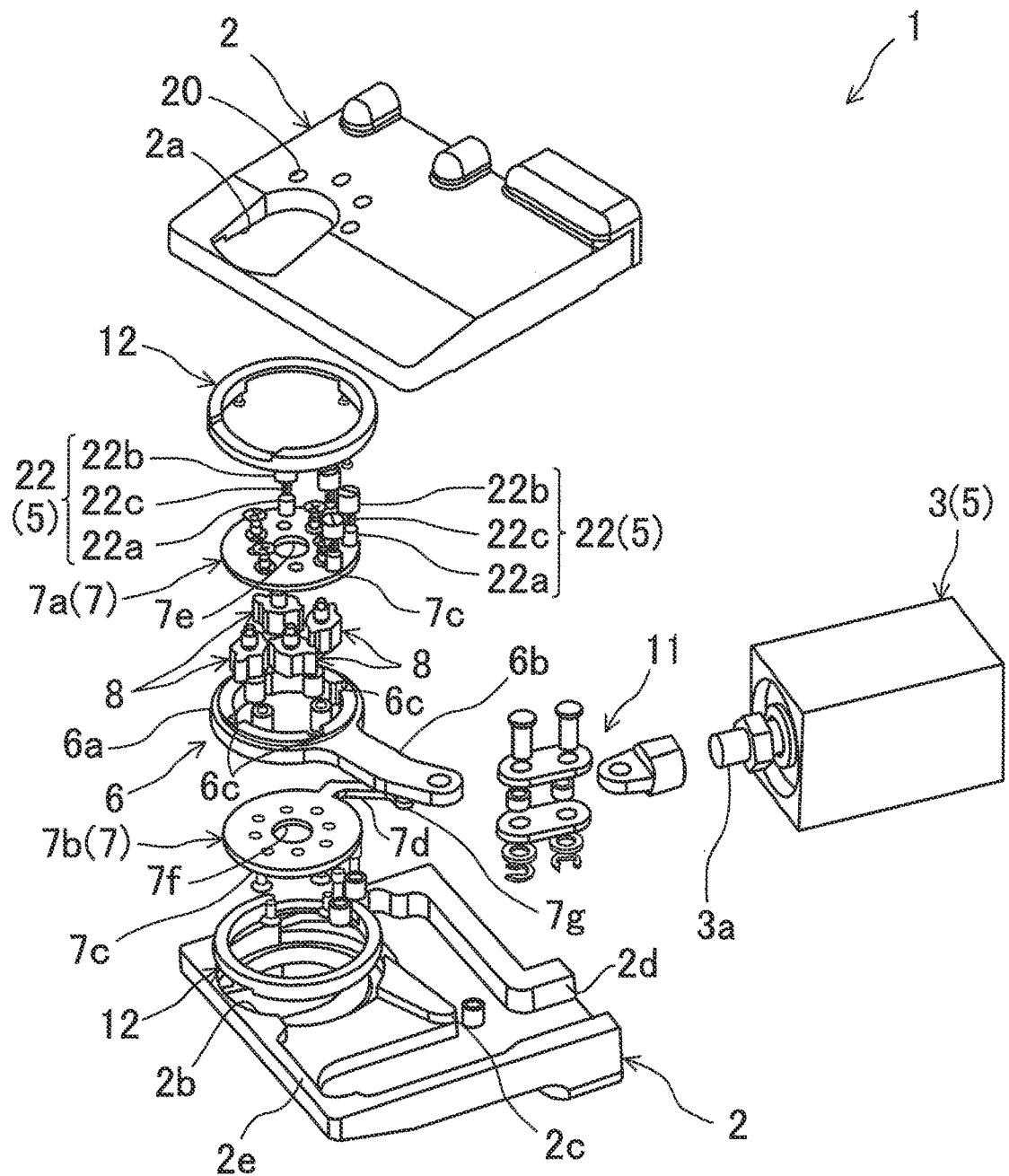
FIG. 2 is an exploded perspective view of the electrode disassembly device for spot welding according to the first embodiment of the present disclosure.

The electrode disassembly device 1 includes a casing 2 that is generally rectangular in a plan view and plate-shaped to have a thickness. As illustrated in FIG. 2, an upper through hole 2a that is generally rectangular when viewed in plan is formed in a top surface of the casing 2 upstream in a direction of a transfer line and on a transfer passage R side to communicate into an interior of the casing 2.

Four screw holes 20 are formed in the top surface of the casing 2 around the upper through hole 2a at predetermined intervals.

Figure 3:
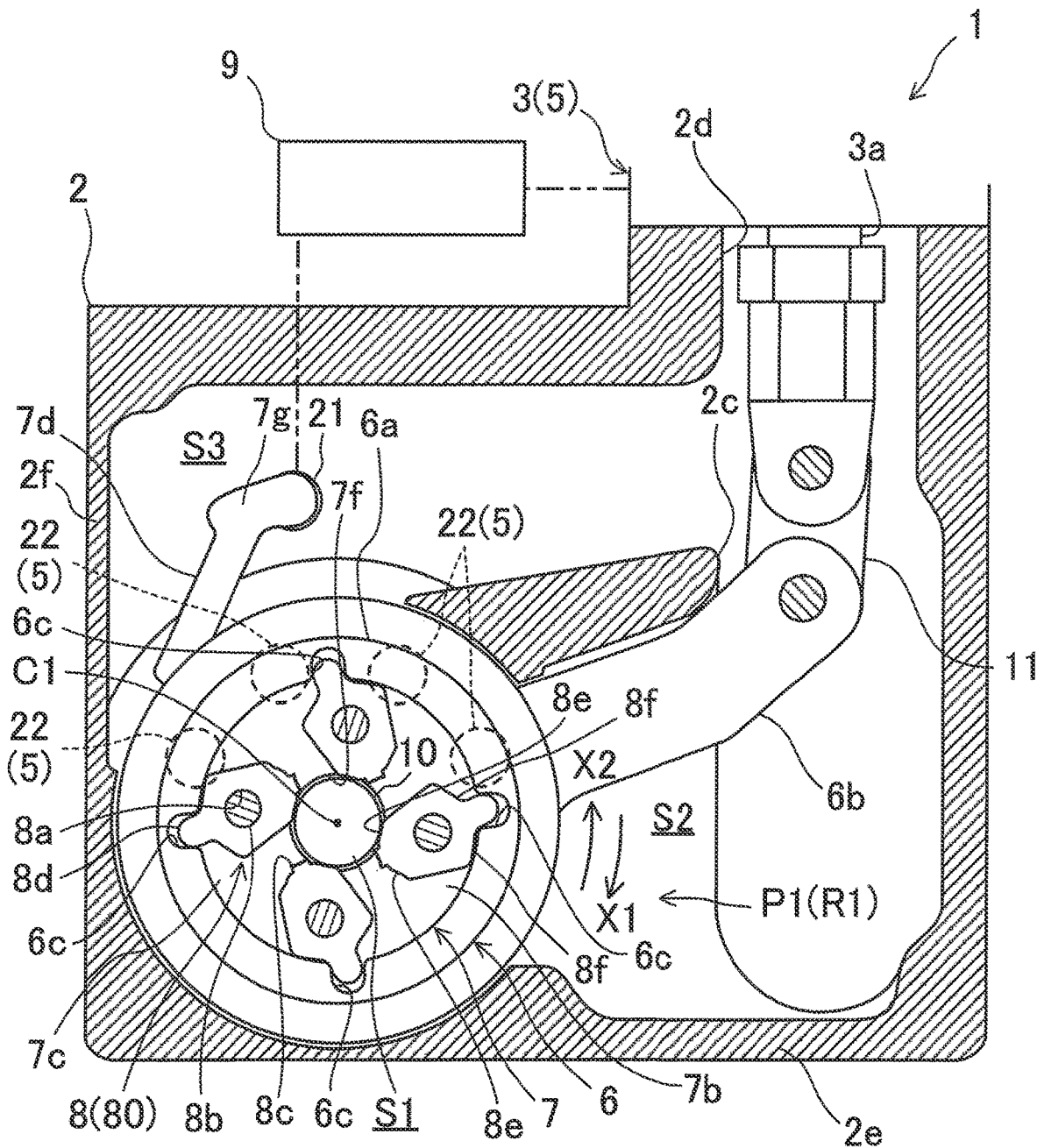
FIG. 3 is a cross-sectional view taken along plane III-III in FIG. 1.

A lower through hole 2b is formed in a lower surface of the casing 2 at a location corresponding to the upper through hole 2a to communicate into the interior of the casing 2. As illustrated in FIG. 3, a detachment operation space S1 serving as a location for performing the detachment operations of the electrode 10 is located between the upper and lower through holes 2a, 2b.

In the interior of the casing 2, a housing space S2 located on the transfer passage R side and a housing space S3 located on an opposite side to the transfer passage R are formed to be parted by a rotation regulating wall 2c located generally at a center portion of the casing 2, and the housing spaces S2, S3 are connected to each other upstream and downstream in the direction of the transfer line.

The detachment operation space S1 is located upstream in the direction of the transfer line in the housing space S2. A communication hole 2d configured to communicate into the housing space S3 is formed in an end portion of the casing 2 on the opposite side to the transfer passage R.

A detection sensor 21 is mounted on a portion of the lower surface of the casing 2 corresponding to the housing space S3 and being upstream in the direction of the transfer line.

A first fluid pressure cylinder 3 configured to be driven by supplying and discharging compressed air is mounted to the end portion of the casing 2 downstream in the direction of the transfer line and on the opposite side to the transfer passage R.

The first fluid pressure cylinder 3 is positioned such that a first piston rod 3a of the first fluid pressure cylinder 3 extends in a horizontal direction intersecting with the direction of the transfer line, and the first piston rod 3a is configured to extend and retract toward the interior of the casing 2 through the communication hole 2d.

As illustrated in FIGS. 2 and 3, a first rotator 6 and a second rotator 7 having a vertically extending axis of rotation C1 located at a center of the detachment operation space S1 are provided in the housing space S2.

The first and second rotators 6, 7 are configured to be rotatable relative to one another around the axis of rotation C1.

The rotator 6 includes a ring portion 6a having a center line aligning with the axis of rotation C1 and a large lever portion 6b extending from an outer peripheral edge of the ring portion 6a toward a downstream side in the direction of the transfer line. The large lever portion 6a includes an extension end portion connected to a distal end of the first piston rod 3a via a connecting member 11.

The ring portion 6a is supported rotatably around the axis of rotation C1 on inner surfaces of the casing 2 by a pair of upper and lower annular bearings 12. While the ring portion 6a is rotated toward one side (X1 direction) by turning the large lever portion 6b to the one side through extension movement of the first piston rod 3a, the ring portion 6a is rotated toward another side (X2 direction) by turning the large lever portion 6b to the other side through retraction movement of the first piston rod 3a.

Figure 5:
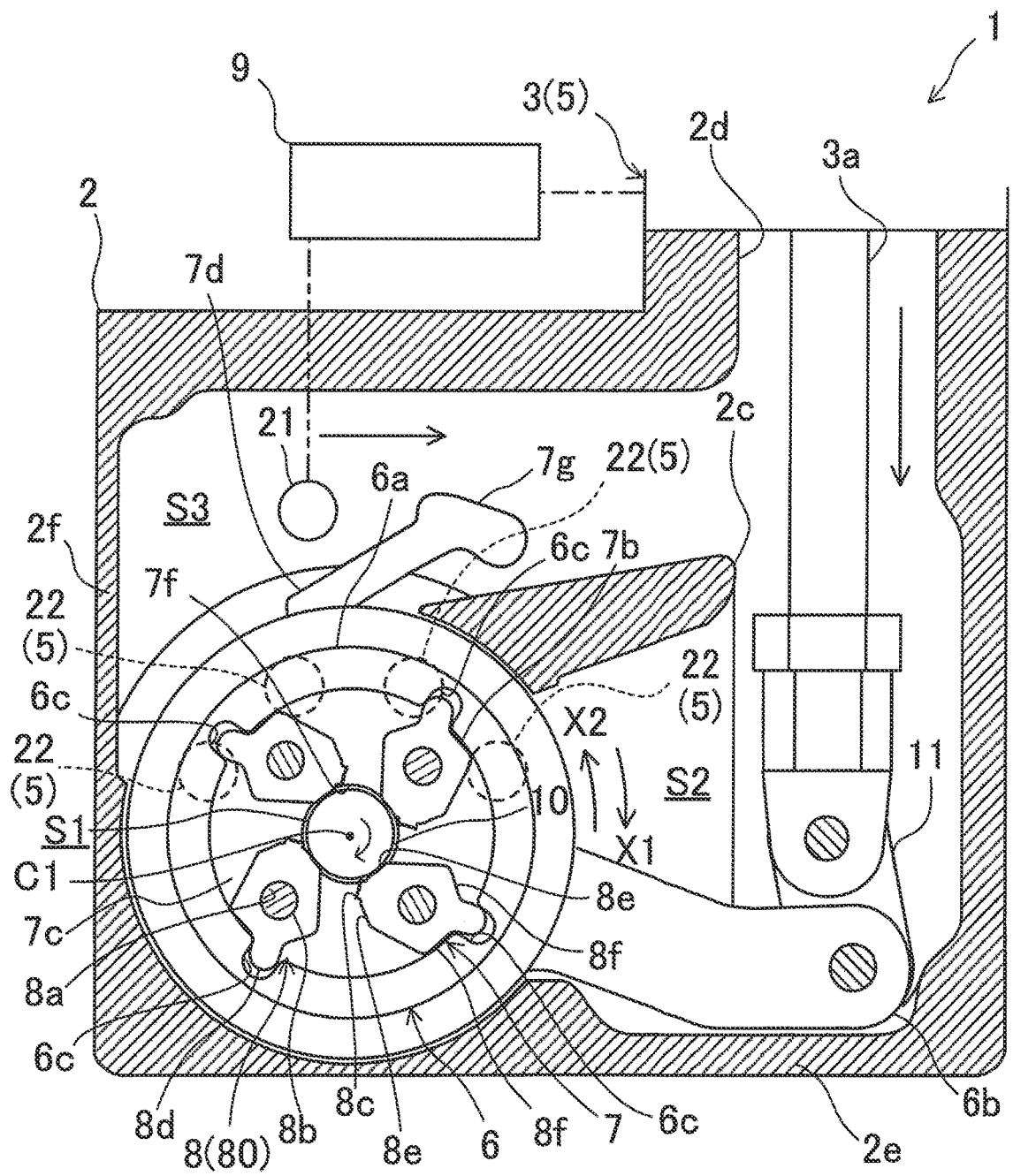
FIG. 5 is a view depicting a state immediately after detaching the one electrode from the distal end of the shank after the state illustrated in FIG. 4.

As illustrated in FIG. 5, when turning toward the one side, the large lever portion 6b contacts a wall 2e of the transfer passage R side of the casing 2 to stop turning further.

Then, as illustrated in FIG. 3, when turning toward the other side, the large lever portion 6b contacts the rotation regulating wall 2c to stop turning further.

Four fitting portions 6c being recessed and open on an inner side of the ring portion 6a are provided in the ring portion 6a at equal intervals around the axis of rotation C1.

The second rotator 7 includes an upper body 7a and a lower body 7b being plate-shaped and located above and below the first rotator 6, respectively.

As illustrated in FIG. 2, the upper body 7a is disk-shaped and a circular through hole 7e corresponding with the detachment operation space S1 is formed at a center of the upper body 7a.

Then, the lower body 7b includes a disk portion 7c having a center line aligning with the axis of rotation C1 and an extension portion 7d extending from an outer peripheral edge of the disk portion 7c toward the opposite side to the transfer passage R.

A distal end portion 7g extending along a circumferential direction around the axis of rotation C1 is provided in an extension end of the extension portion 7d and the detection sensor 21 can detect the distal end portion 7g.

A circular through hole 7f corresponding with the detachment operation space S1 is formed at a center of the disk portion 7c and a space between the through hole 7e and through hole 7f is the detachment operation space S1.

Figure 6:
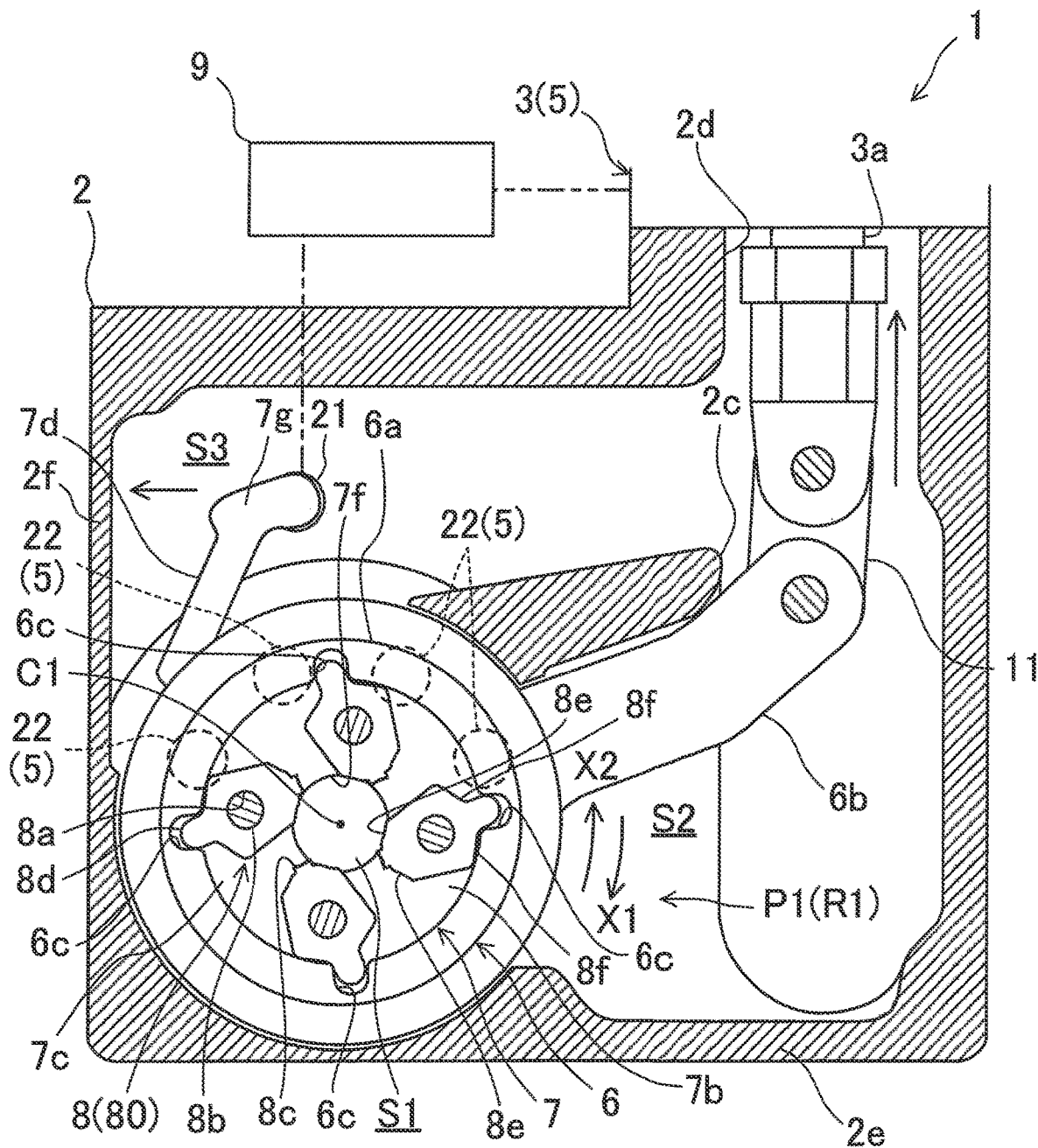
FIG. 6 is a view depicting a state immediately after components start transitioning to initial locations for detaching another electrode from a distal end of a shank, after the state illustrated in FIG. 5.
Figure 15:
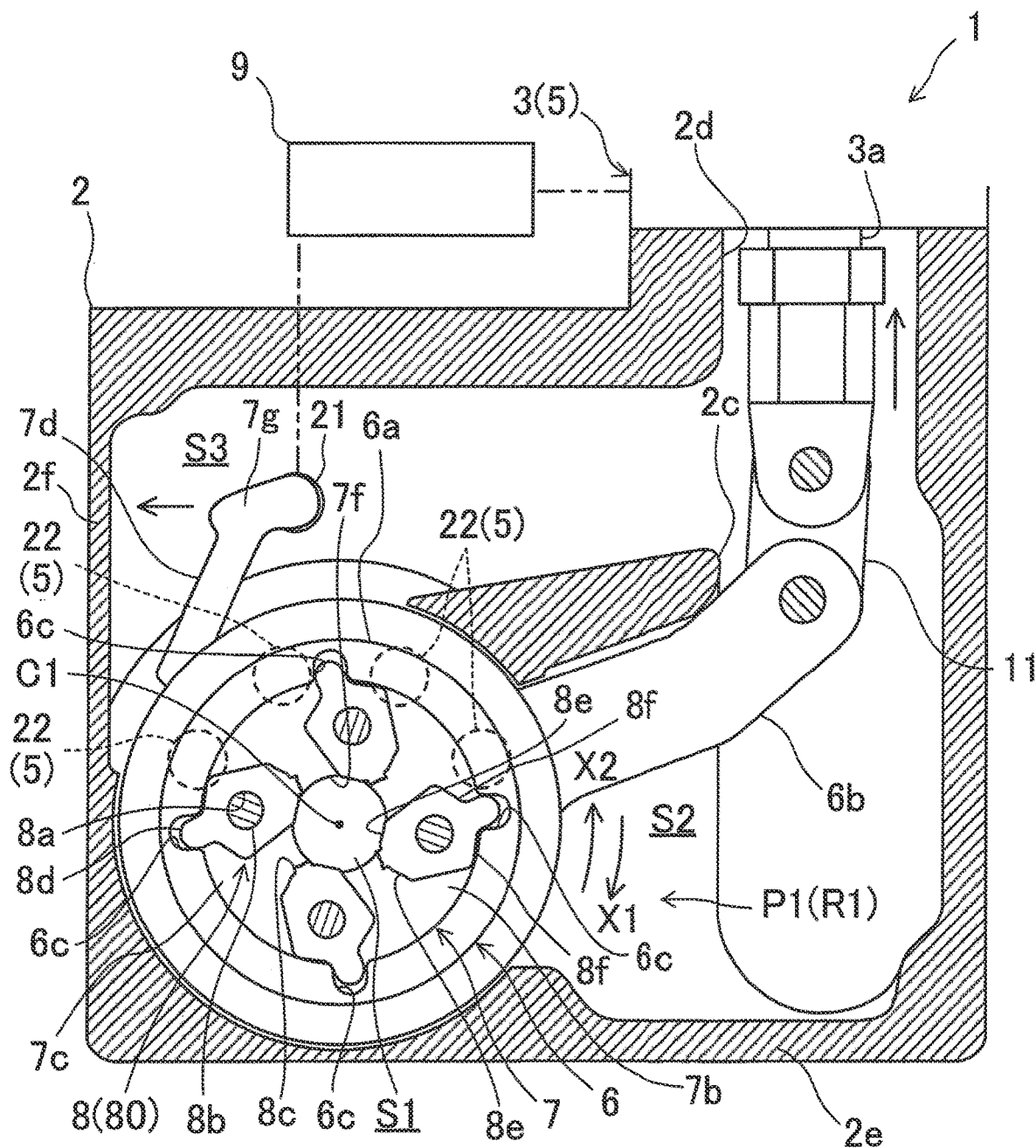
FIG. 15 is a view depicting a state immediately after the components have been transitioned to the initial locations for detaching the one electrode from the distal end of the shank, after the state illustrated in FIG. 14.
Figure 16:
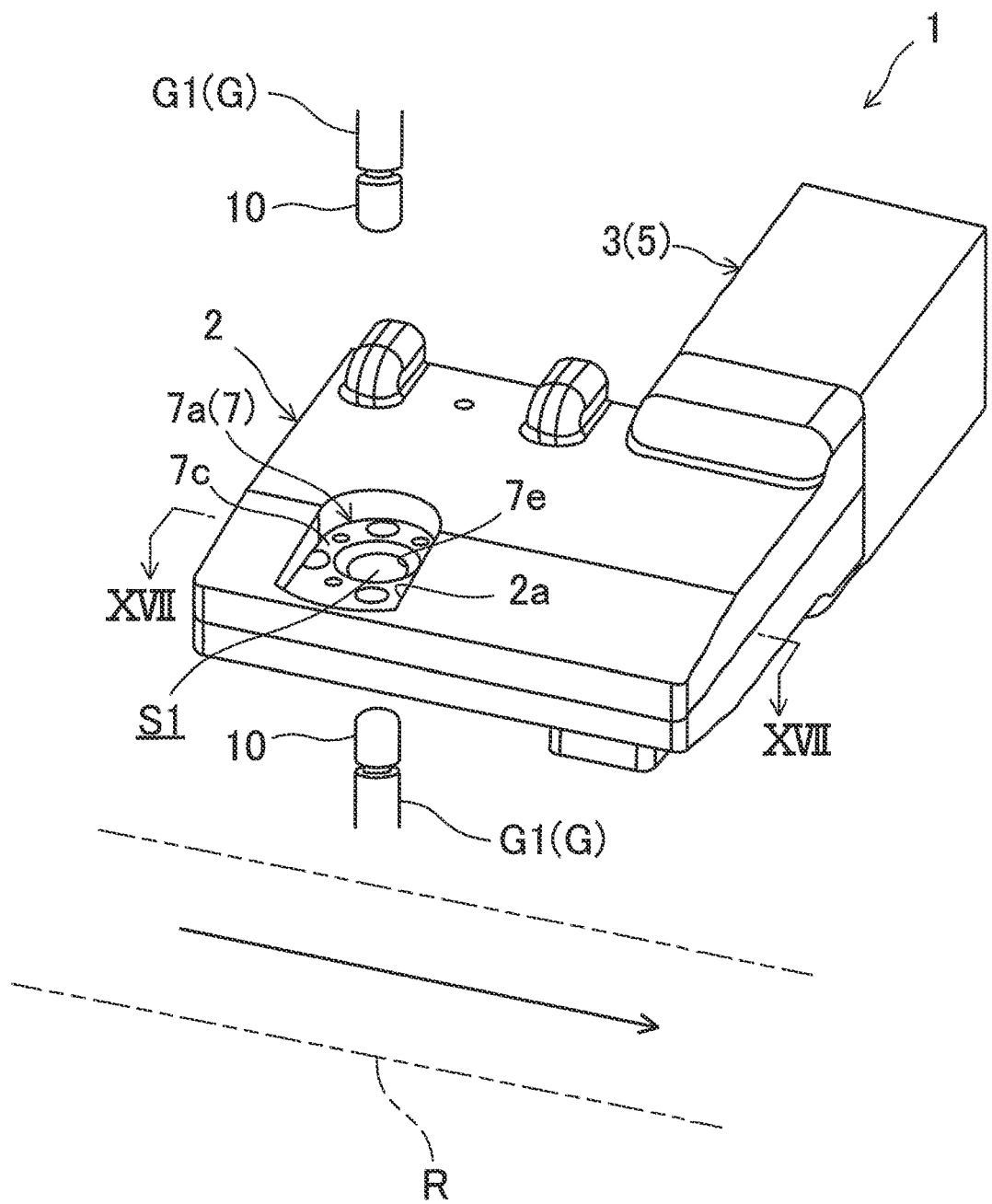
FIG. 16 is a view corresponding to FIG. 1, according to a second embodiment of the present disclosure.

As illustrated in FIGS. 3, 6, and 15, a location of the first rotator 6 at which the large lever portion 6b is brought adjacent to the rotation regulating wall 2c and a location of the second rotator 7 at which one end of the distal end portion 7g corresponds to the detection sensor 21 is a first detachment starting position P1 for starting the detachment operations of one (lower) electrode 10. A relative positional relationship of the first rotator 6 and the second rotator 7 at the first detachment starting position P1 is a first relative positional relationship R1 of the present disclosure.

Figure 9:
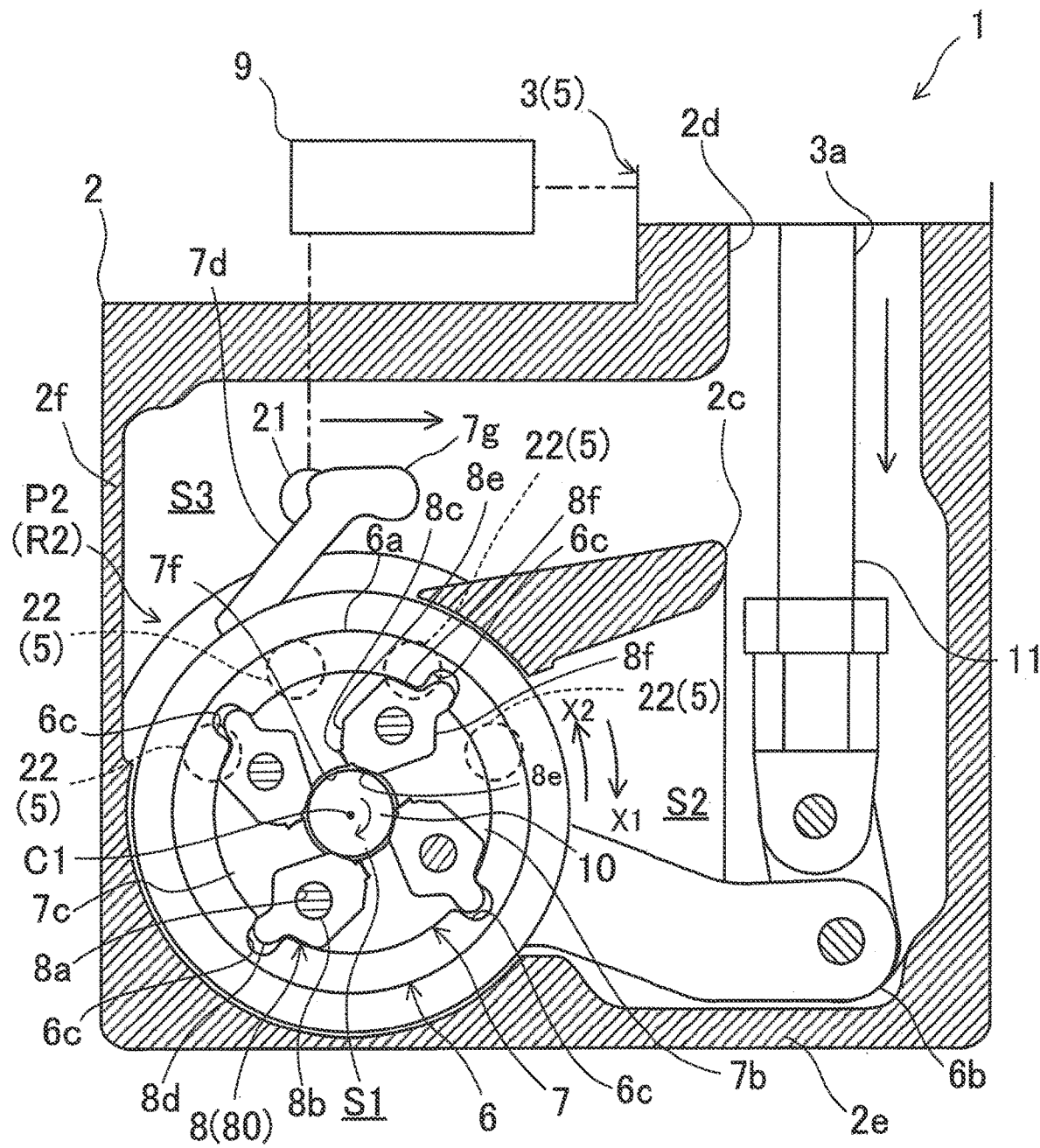
FIG. 9 is a view depicting a state immediately after the components have transitioned to the initial locations for detaching the other electrode from the distal end of the shank after the state illustrated in FIG. 8.
Figure 12:
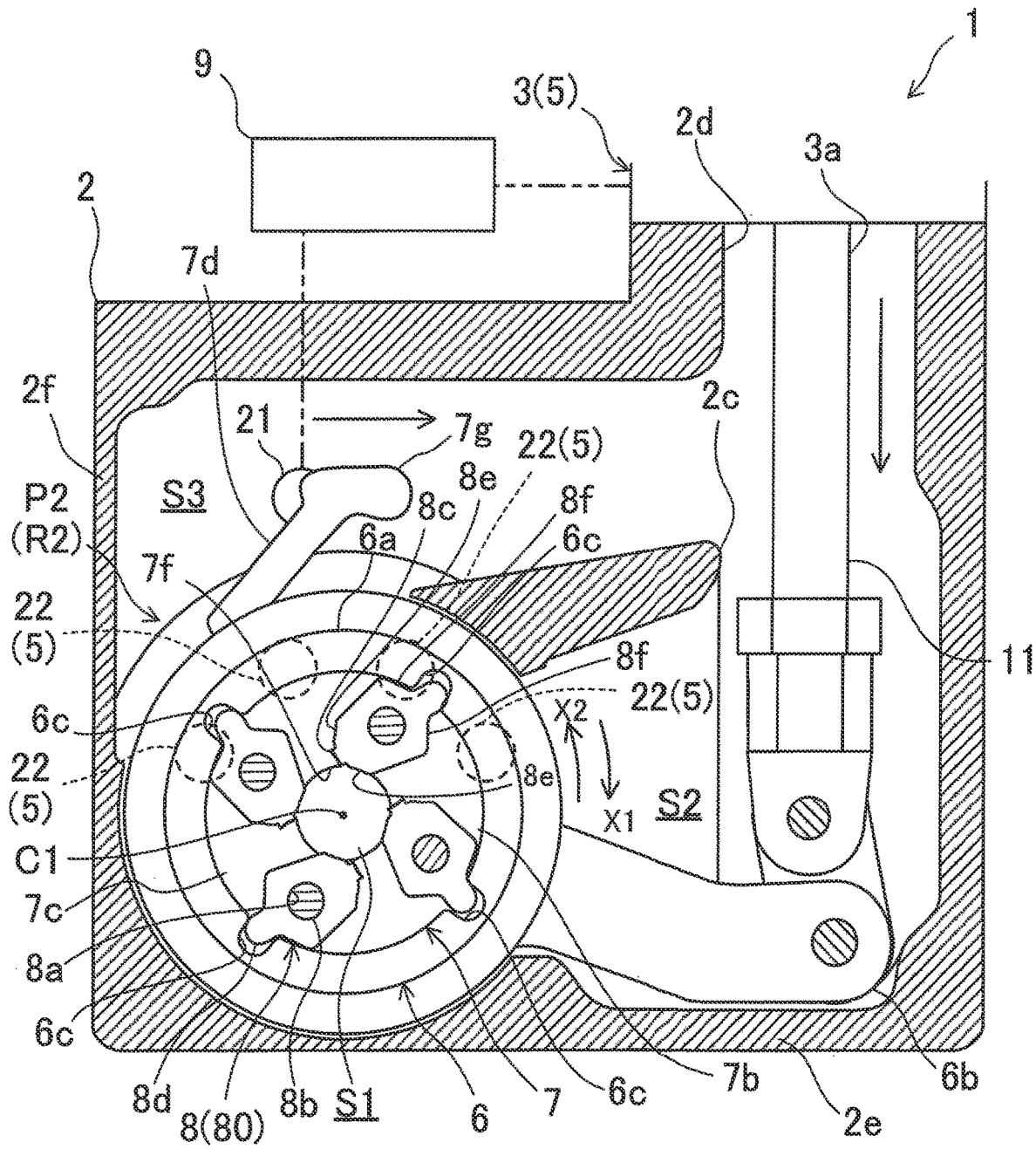
FIG. 12 is a view depicting a state immediately after the components start transitioning to initial locations for detaching one electrode from the distal end of the shank, after the state illustrated in FIG. 11.

As illustrated in FIGS. 9 and 12, a location of the first rotator 6 at which the large lever portion 6b is brought adjacent to the wall 2e and a location of the second rotator 7 at which another end of the distal end portion 7g corresponds to the detection sensor 21 is a second detachment starting position P2 for starting the detachment operations of another (upper) electrode 10. A relative positional relationship of the first rotator 6 and the second rotator 7 at the second detachment starting position P2 is a second relative positional relationship R2 of the present disclosure.

As a result, the first and second relative positional relationships R1, R2 according to the first embodiment are relative positional relationships in which the positional relationships between the first and second rotators 6, 7 differ.

When the first and second rotators 6, 7 are in the first and second relative positional relationships R1, R2, the second rotator 7 has the extension portion 7d located corresponding to the detection sensor 21.

As illustrated in FIGS. 2 and 3, a set of graspers 80 including four of the graspers 8 are disposed inwardly of the ring portion 6a and between the upper body 7a and the disk portion 7c. Each of the graspers 8 is provided at a location corresponding to an associated one of the fitting portions 6c.

An insertion hole 8a is formed generally at a center of each of the graspers 8 and a shaft 8b extending along a same direction as the axis of rotation C1 is inserted into the insertion hole 8a.

The shaft 8b includes end portions secured to the upper body 7a and the disk portion 7c, respectively. The grasper 8 is thus supported on the second rotator 7 pivotally and rotatably around the shaft 8b.

A pawl portion 8c protrudes at a distal end portion of the grasper 8 on a detachment operation space S1 side. A pair of curved faces 8e curved gently to correspond with an outer circumferential surface of the electrode 10 are formed on either lateral side of the pawl portion 8c of the grasper 8.

Then, a protrusion 8d (base portion) protruding toward an opposite side to the detachment operation space S1 is provided at a center of a base end of the grasper 8. The protrusion 8d is configured to be loosely fitted into a corresponding fitting portion 6c.

A pair of inclined faces 8f inclined to be increasingly spaced from each other away from the protrusion 8d are formed continuous with the protrusion 8d on either lateral side of the protrusion 8d of the grasper 8.

Then, as illustrated in FIGS. 6 to 9, when the first and second rotators 6, 7 are rotated relative to each other toward the one side in the first relative positional relationship R1, i.e., when the first rotator 6 is rotated relative to the second rotator 7 toward the one side, the fitting portions 6c press the protrusions 8d toward the one side and thereby the graspers 8 turn toward the one side to cause the pawl portions 8c to advance into the detachment operation space S1 and then to retract from the detachment operation space S1.

As illustrated in FIGS. 12 to 15, when the first and second rotators 6, 7 are rotated relative to each other toward the other side in the second relative positional relationship R2, i.e., when the first rotator 6 is rotated relative to the second rotator 7 toward the other side, the fitting portions 6c press the protrusions 8d toward the other side and thereby the graspers 8 turn toward the other side to cause the pawl portions 8c to advance into the detachment operation space S1 and then to retract from the detachment operation space S1.

A brake mechanism 22 is attached to each of the screw holes 20 of the casing 2. The brake mechanism 22 and the first fluid pressure cylinder 3 constitute a drive unit 5 of the first embodiment of present disclosure.

The brake mechanism 22 includes, as illustrated in FIG. 2, a brake body 22a being cylindrical and movable along the axis of rotation C1, a screw 22b configured to be screwed into the screw hole 20, and a coil spring 22c (urging means) provided between the brake body 22a and the screw 22b and configured to urge the brake body 22a toward the second rotator 7 to bring the brake body 22a in sliding contact with the second rotator 7, wherein as an amount of insertion of the screw 22b changes, urging force of the coil spring 22c may vary.

A controller 9 for controlling the first fluid pressure cylinder 3 is connected to the first fluid pressure cylinder 3 and the detection sensor 21.

The controller 9 outputs an actuation signal to the first fluid pressure cylinder 3 to thereby extend and retract the first piston rod 3a, so that the first rotator 6 is rotated towards the one side or the other side.

When the electrode 10 held on the shank G1 located on a lower side is detached, the controller 9 outputs an actuation signal to the first fluid pressure cylinder 3 to extend the first piston rod 3a, in the state where the electrode 10 is set in the detachment operation space S1 in which the first and second rotators 6, 7 are at the first detachment starting position P1 and in the first relative positional relationship R1, as illustrated in FIG. 3. Thereby, the first rotator 6 is rotated toward the one side relative to the second rotator 7 which stops its rotation due to the urging force of the brake mechanism 22, and the pressing of the fitting portions 6c to the protrusions 8d toward the one side causes the graspers 8 to turn toward the one side and the pawl portions 8c to advance into the detachment operation space S1 so as to bring the pawl portions 8c in contact with the electrode 10. This allows the pawl portions 8c to grasp the electrode 10.

Figure 4:
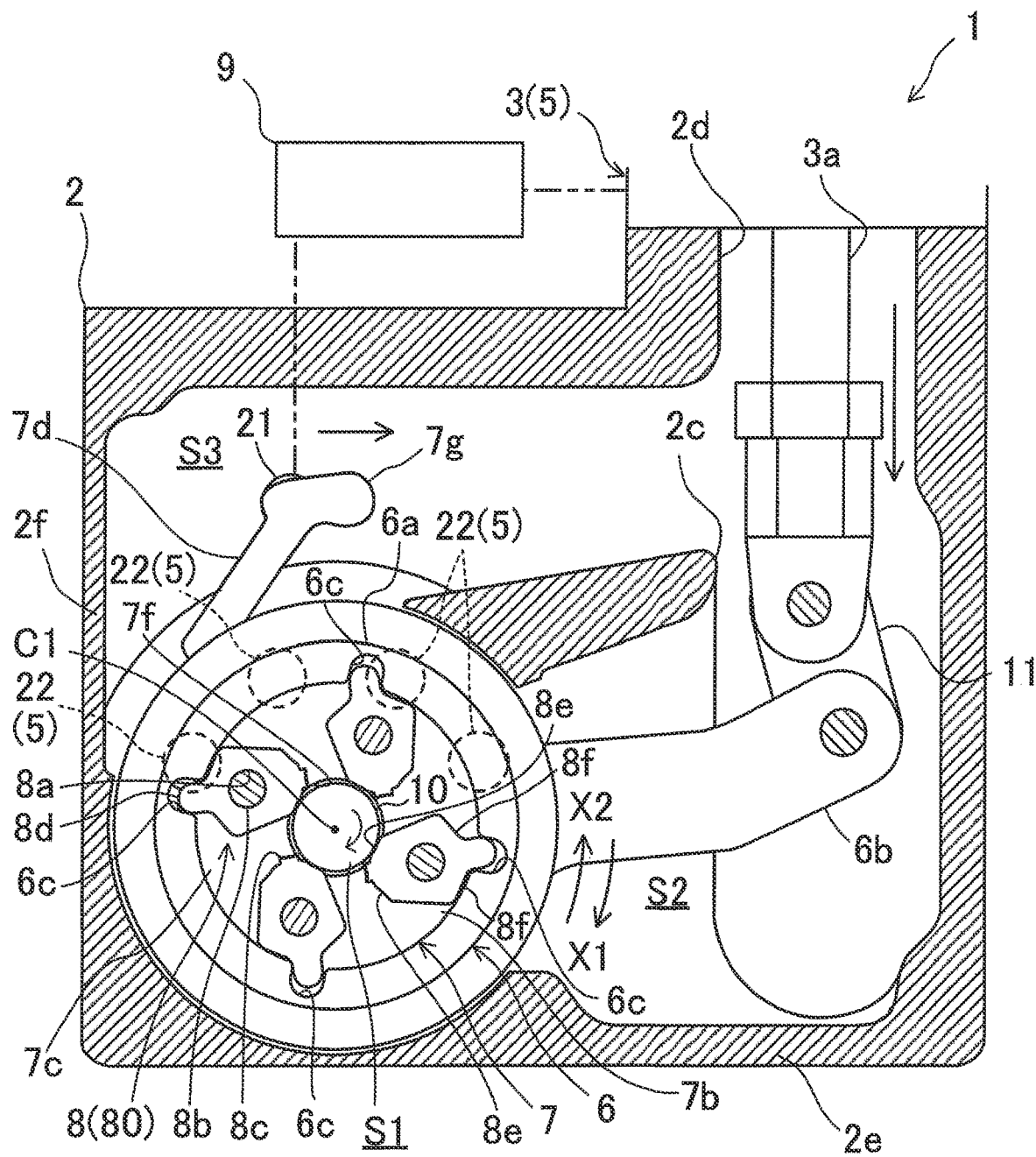
FIG. 4 is a view depicting a state in the midst of detaching one electrode from a distal end of a shank after the state illustrated in FIG. 3.

Then, as illustrated in FIGS. 4 and 5, when the pawl portions 8c grasp the electrode 10, the controller 9 controls the first fluid pressure cylinder 3 such that the first piston rod 3a continues to further extend, and thereby the first and second rotators 6, 7 are rotated in an integrated manner together with the electrode 10 toward the one side against the urging force of the brake mechanism 22 to detach the electrode 10 from the distal end of the shank G1. In this instance, the second rotator 7 is rotated toward the one side to locate the extension portion 7d not to correspond to the detection sensor 21.

Figure 7:
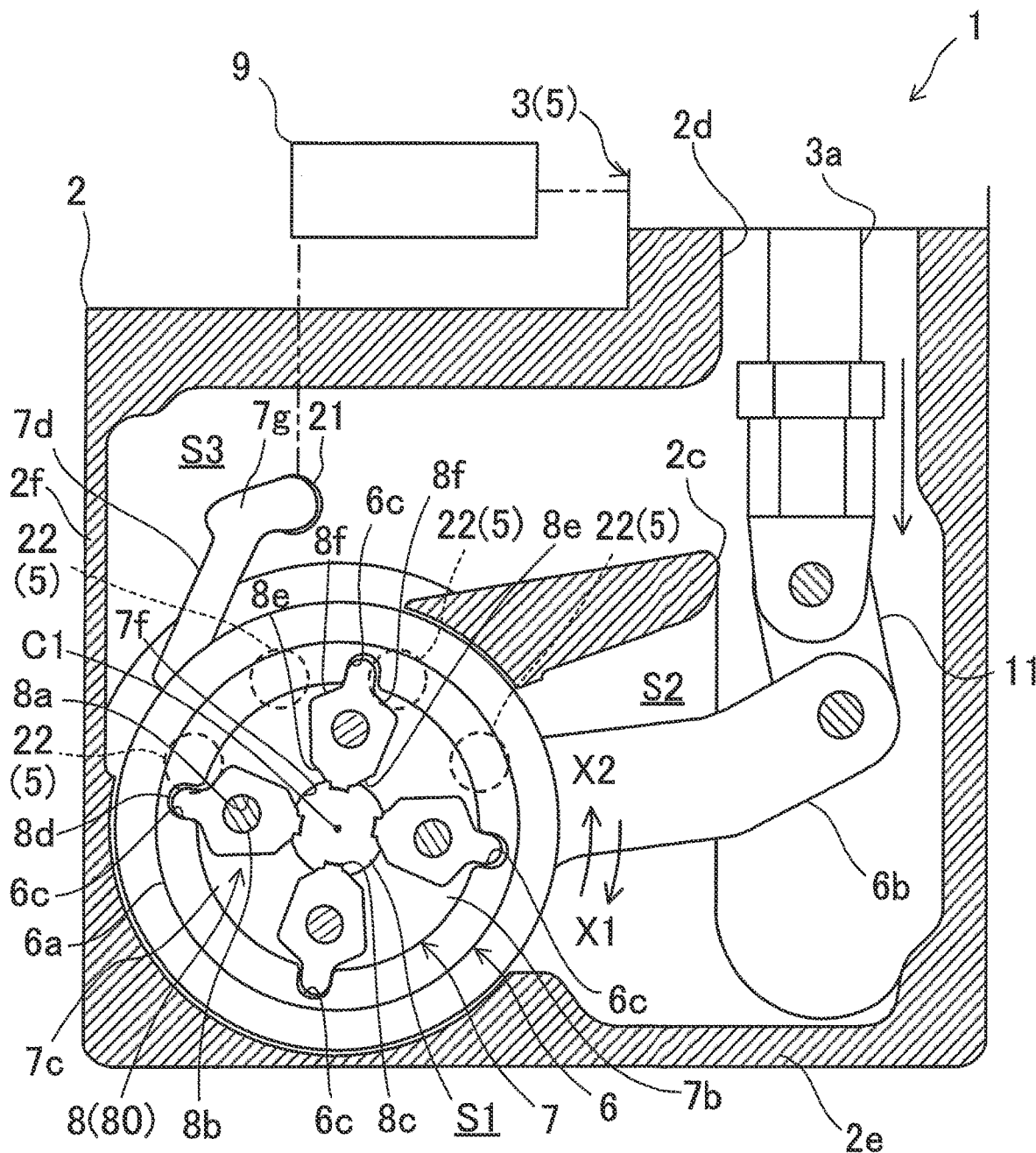
FIG. 7 is a view depicting a state in the midst of the transition of the components to the initial locations for detaching the other electrode from the distal end of the shank, after the state illustrated in FIG. 6.
Figure 8:
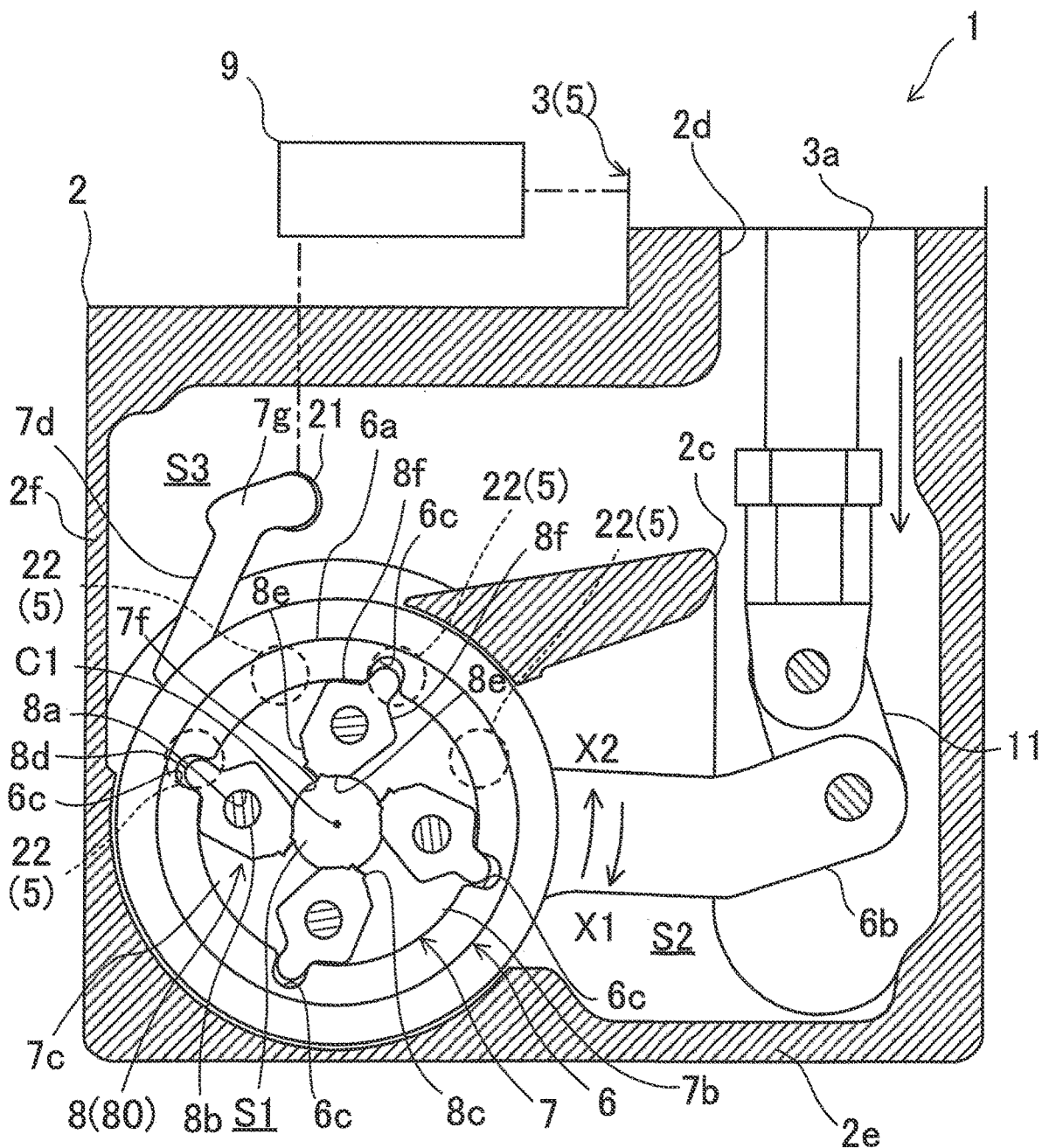
FIG. 8 is a view depicting a state in the midst of the transition of the components to the initial locations for detaching the other electrode from the distal end of the shank, after the state illustrated in FIG. 7.

The controller 9 also outputs an actuation signal to the first fluid pressure cylinder 3 to extend the first piston rod 3a, in the state where the electrode 10 is not set in the detachment operation space S1 in which the first and second rotators 6, 7 are at the first detachment starting position P1, as illustrated in FIG. 6. Thereby, the first rotator 6 is rotated toward the one side relative to the second rotator 7 which stops its rotation by the brake mechanism 22, and the pressing of the fitting portions 6c to the protrusions 8d toward the one side causes the graspers 8 to turn toward the one side. This causes the pawl portions 8c to advance into the detachment operation space S1 and then to retract from the detachment operation space S1, as illustrated in FIGS. 7 and 8.

Further, after causing the pawl portions 8c to retract from detachment operation space S1, the controller 9 continues to control the first fluid pressure cylinder 3 such that the first piston rod 3a further extends, and thereby one of the inclined faces 8f of each of the graspers 8 contacts an inner circumferential surface of the ring portion 6a to cause the first and second rotators 6, 7 to rotate in an integrated manner toward the one side against the urging force of the brake mechanism 22 and then to be at the second detachment starting position P2 and in the second relative positional relationship R2, as illustrated in FIG. 9.

In contrast, when the other electrode 10 held on the shank G1 located on an upper side is detached, the controller 9 outputs an actuation signal to the first fluid pressure cylinder 3 to retract the first piston rod 3a, in the state where the electrode 10 is set in the detachment operation space S1 in which the first and second rotators 6, 7 are at the second detachment starting position P2 and in the second relative positional relationship R2, as illustrated in FIG. 9. Thereby, the first rotator 6 is rotated toward the other side relative to the second rotator 7 which stops its rotation due to the urging force of the brake mechanism 22, and the pressing of the fitting portions 6c to the protrusions 8d toward the other side causes the graspers 8 to turn toward the other side and the pawl portions 8c to advance into the detachment operation space S1 so as to bring the pawl portions 8c in contact with the electrode 10. This allows the pawl portions 8c to grasp the electrode 10.

Figure 10:
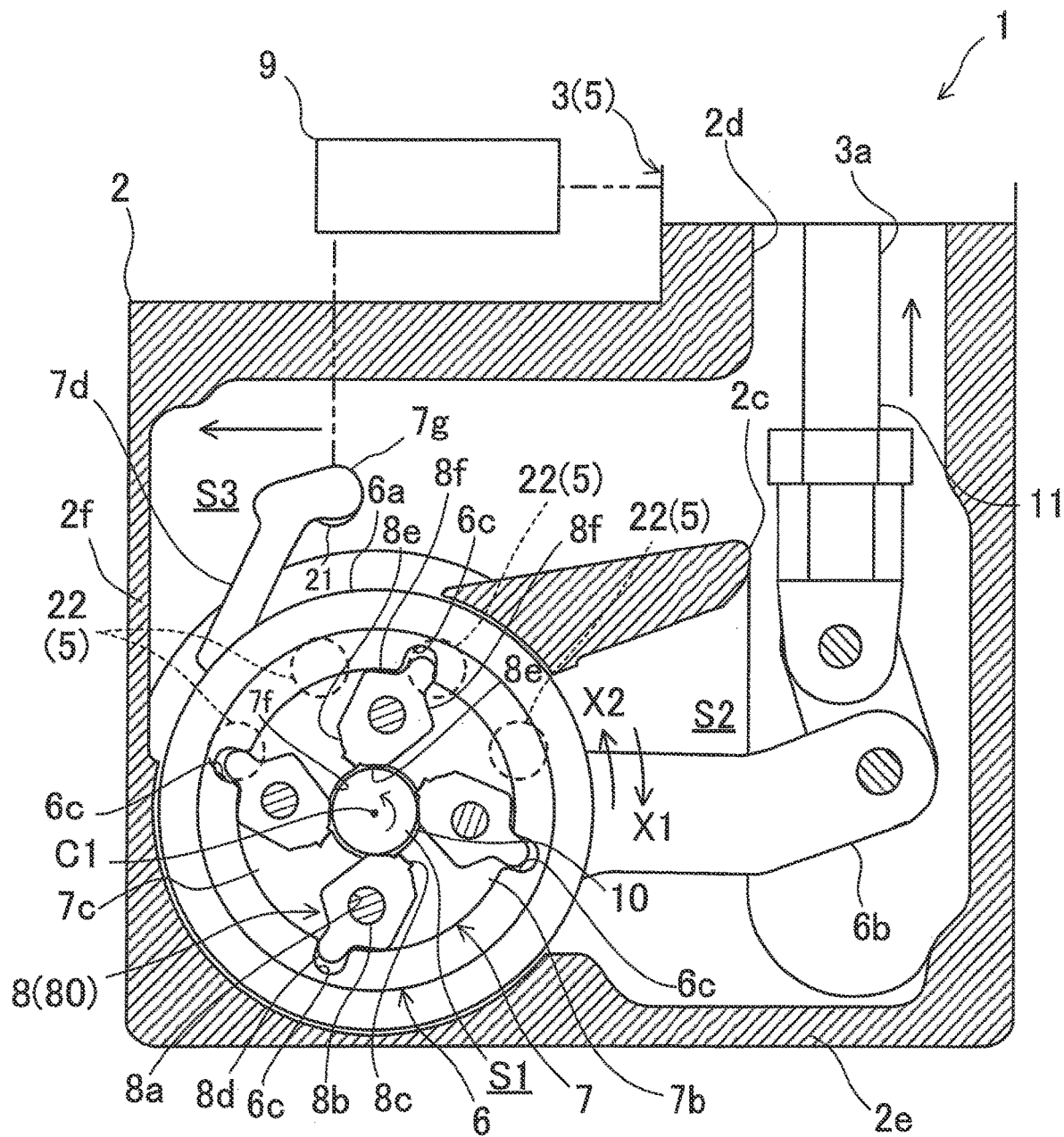
FIG. 10 is a view depicting a state in the midst of detaching the other electrode from the distal end of the shank after the state illustrated in FIG. 9.
Figure 11:
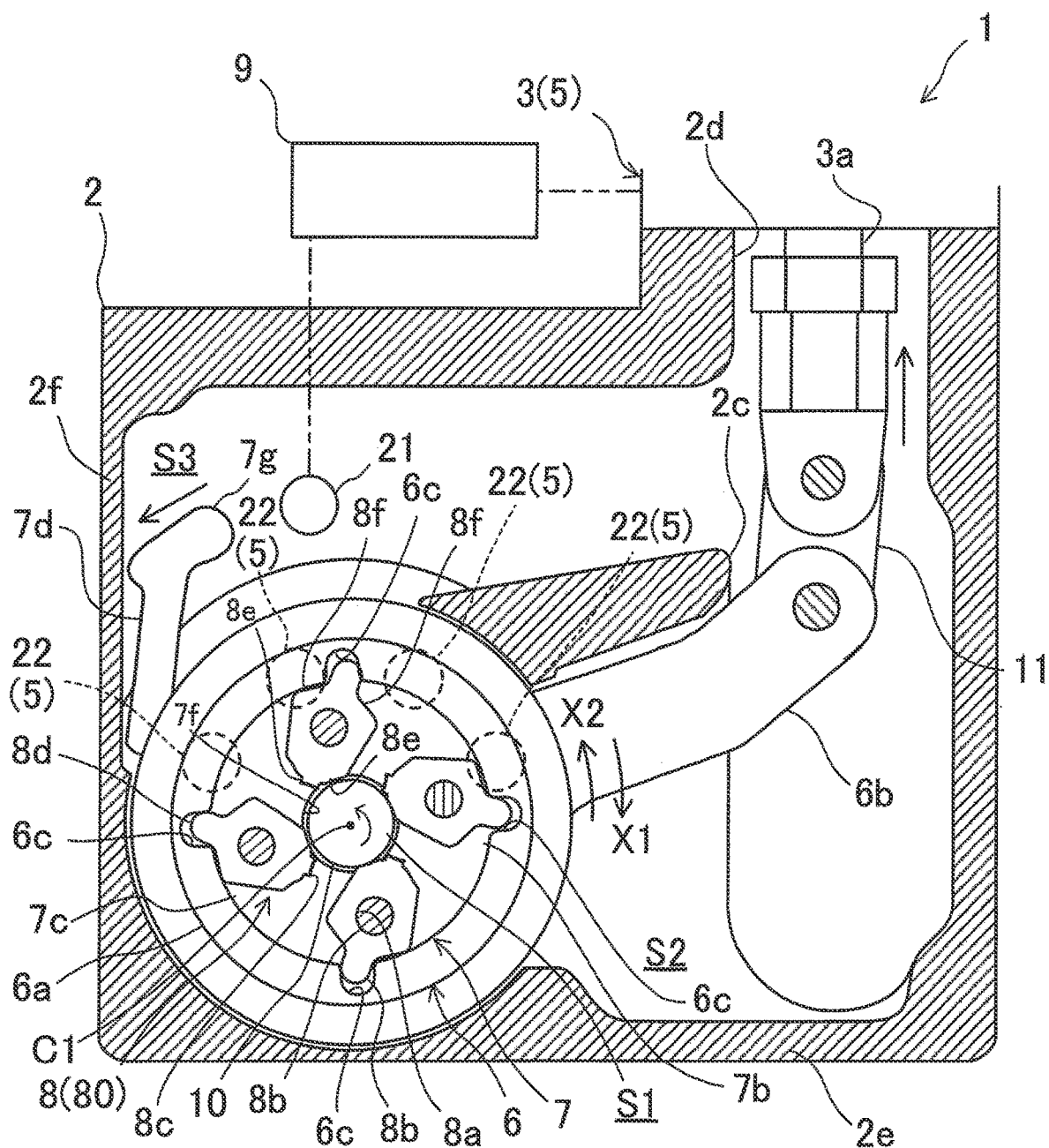
FIG. 11 is a view depicting a state immediately after detaching the other electrode from the distal end of the shank after the state illustrated in FIG. 10.

Then, as illustrated in FIGS. 10 and 11, when the pawl portions 8c grasp the electrode 10, the controller 9 controls the first fluid pressure cylinder 3 such that the first piston rod 3a continues to further retract, and thereby the first and second rotators 6, 7 are rotated in an integrated manner together with the electrode 10 toward the other side against the urging force of the brake mechanism 22 to detach the electrode 10 from the distal end of the shank G1. In this instance, the second rotator 7 is rotated toward the other side to locate the extension portion 7d not to correspond to the detection sensor 21.

Figure 13:
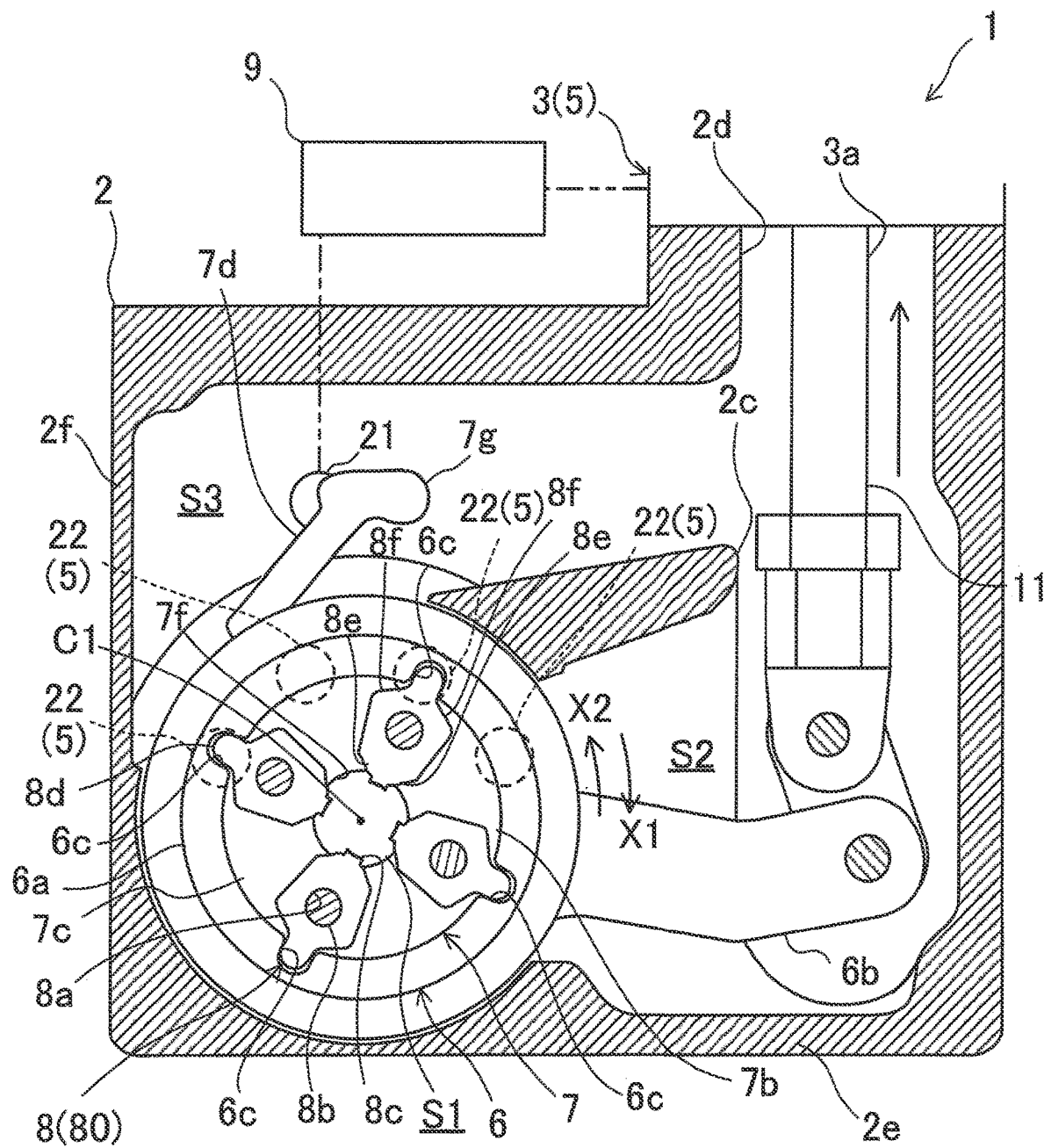
FIG. 13 is a view depicting a state in the midst of the transition of the components to the initial locations for detaching the one electrode from the distal end of the shank, after the state illustrated in FIG. 12.
Figure 14:
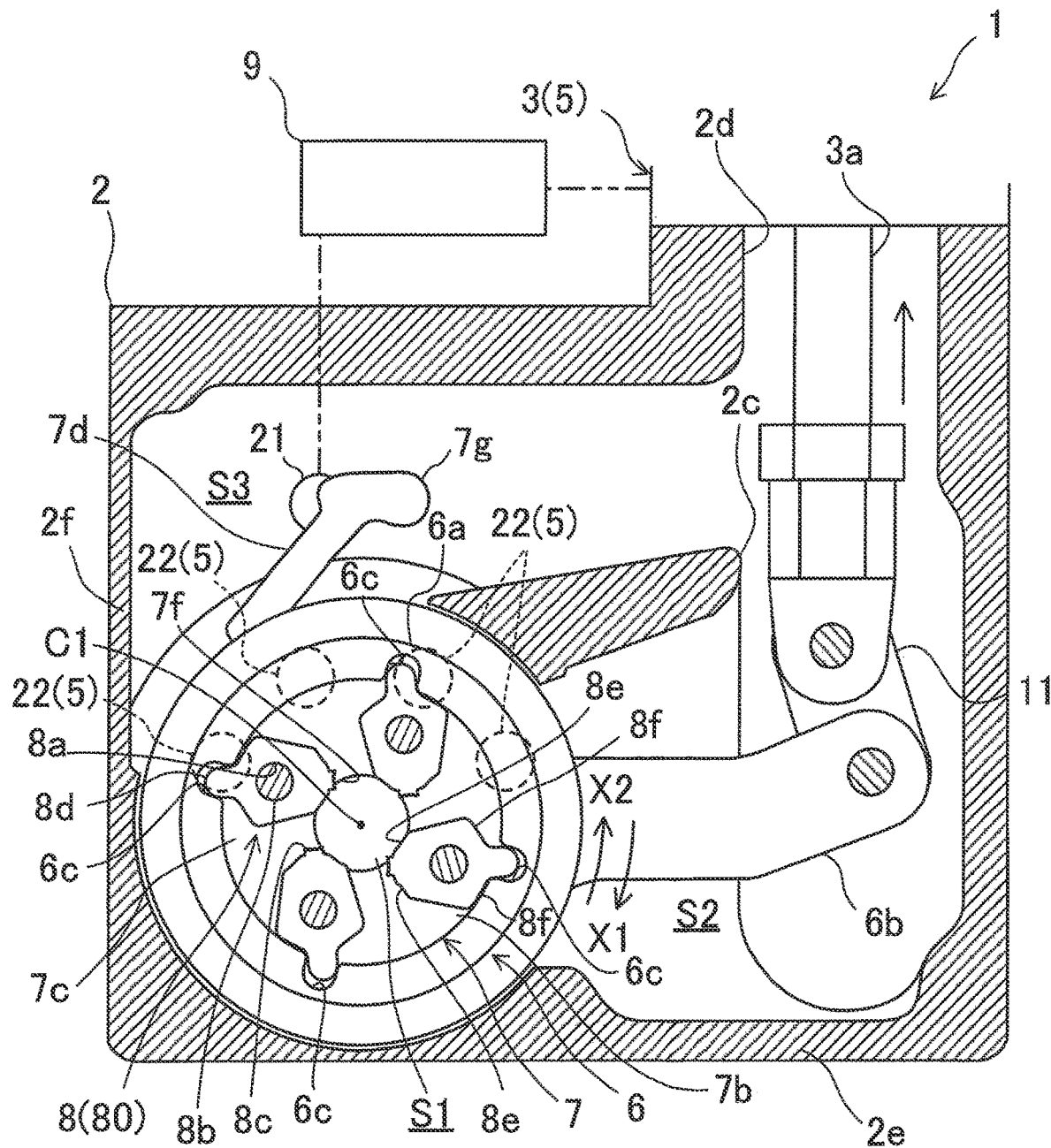
FIG. 14 is a view depicting a state in the midst of the transition of the components to the initial locations for detaching the one electrode from the distal end of the shank, after the state illustrated in FIG. 13.

The controller 9 also outputs an actuation signal to the first fluid pressure cylinder 3 to retract the first piston rod 3a, in the state where the electrode 10 is not set in the detachment operation space S1 in which the first and second rotators 6, 7 are at the second detachment starting position P2, as illustrated in FIG. 12. Thereby, the first rotator 6 is rotated toward the other side relative to the second rotator 7 which stops its rotation by the brake mechanism 22, and the pressing of the fitting portions 6c to the protrusions 8d toward the other side causes the graspers 8 to turn toward the other side. This causes the pawl portions 8c to advance into the detachment operation space S1 and then to retract from the detachment operation space S1, as illustrated in FIGS. 13 and 14.

Further, after causing the pawl portions 8c to retract from detachment operation space S1, the controller 9 continues to control the first fluid pressure cylinder 3 such that the first piston rod 3a further retracts, and thereby another of the inclined faces 8f of each of the graspers 8 contacts the inner circumferential surface of the ring portion 6a to cause the first and second rotators 6, 7 to rotate in an integrated manner toward the other side against the urging force of the brake mechanism 22 and then to be at the first detachment starting position P1 and in the first relative positional relationship R1, as illustrated in FIG. 15.

Next, operations for detaching a pair of electrodes 10 held on a welding gun G by using the electrode disassembly device 1 for spot welding according to the first embodiment are described in detail.

First, the welding gun G is moved to set a lower electrode 10 in the detachment operation space S1 from below in the state where the first and the second rotators 6, 7 are at the first detachment starting position P1 and in the first relative positional relationship R1, as illustrated in FIG. 3. After that, the controller 9 controls the first fluid pressure cylinder 3 to extend the first piston rod 3a. The first rotator 6 is then rotated toward one side relative to the second rotator 7 which stops its rotation due to urging force of the brake mechanism 22, to cause the fitting portions 6c to press the respective protrusions 8d of the graspers 8 toward the one side. The graspers 8, the protrusions 8d of which are pressed toward the one side, turn toward the one side, and thus the pawl portions 8c of the graspers 8 advance into the detachment operation space S1 to contact the electrode 10 for grasping the electrode 10.

After the pawl portions 8c have grasped the electrode 10, the controller 9 further controls the first fluid pressure cylinder 3 to continue to extend the first piston rod 3a. As illustrated in FIGS. 4 and 5, the first and second rotators 6, 7 are then rotated in an integrated manner together with the electrode 10 toward the one side against the urging force of the brake mechanism 22 to detach the electrode 10 from a distal end of a shank G1. In this instance, the extension portion 7d moves from a location corresponding to the detection sensor 21 to a location not corresponding to, so that the controller 9 recognizes that the electrode 10 has been detached from the distal end of the shank G1.

After that, the controller 9 controls the first fluid pressure cylinder 3 to retract the first piston rod 3a. The first rotator 6 is then rotated toward another side in the state where the second rotator 7 stops due to the urging force of the brake mechanism 22, to cause the graspers 8 to turn toward the other side. Then, the other of the inclined faces 8f of each of the graspers 8 contacts the inner circumferential surface of the ring portion 6a to thereby cause the first and second rotators 6, 7 to be rotated in an integrated manner toward the other side against the urging force of the brake mechanism 22. As illustrated in FIG. 6, the first and second rotators 6, 7 then return to the first detachment starting position P1 and the first relative positional relationship R1. In this instance, the extension portion 7d returns to the location corresponding to the detection sensor 21 by rotating the second rotator 7 toward the other side.

Next, the controller 9 controls the first fluid pressure cylinder 3 to extend the first piston rod 3a. As illustrated in FIG. 7, this extension of the first piston rod 3a causes the first rotator 6 to rotate toward the one side relative to the second rotator 7 which stops its rotation due to the urging force of the brake mechanism 22, and this rotation of the first rotator 6 causes the graspers 8 to turn toward the one side. Thus, the pawl portions 8c advance into the detachment operation space S1 and then retract from the detachment operation space S1. Then, as illustrated in FIG. 8, the one of the inclined faces 8f of each of the graspers 8 contacts the inner circumferential surface of the ring portion 6a to thereby cause the first and second rotators 6, 7 to rotate in an integrated manner toward the one side against the urging force of the brake mechanism 22. After that, as illustrated in FIG. 9, the first and second rotators 6, 7 are located at the second detachment starting position P2 and in the second relative positional relationship R2. In this instance, while the second rotator 7 is rotated from the first detachment starting position P1 toward the one side, the extension portion 7d remains in the location corresponding to the detection sensor 21.

Then, the welding gun G is moved to set an upper electrode 10 in the detachment operation space S1 from above and thereafter, the controller 9 controls the first fluid pressure cylinder 3 to retract the first piston rod 3a. The first rotator 6 is then rotated toward the other side relative to the second rotator 7 which stops its rotation due to the urging force of the brake mechanism 22, to cause the fitting portions 6c to press the respective protrusions 8d of the graspers 8 toward the other side. The graspers 8, the protrusions 8d of which are pressed toward the other side, turn toward the other side, and thus the pawl portions 8c of the graspers 8 advance into the detachment operation space S1 to contact the electrode 10 for grasping the electrode 10.

After the pawl portions 8c have grasped the electrode 10, the controller 9 further controls the first fluid pressure cylinder 3 to continue to retract the first piston rod 3a. As illustrated in FIGS. 10 and 11, the first and second rotators 6, 7 are then rotated in an integrated manner together with the electrode 10 toward the other side against the urging force of the brake mechanism 22 to detach the electrode 10 from a distal end of a shank G1. In this instance, the extension portion 7d moves from the location corresponding to the detection sensor 21 to the location not corresponding to, so that the controller 9 recognizes that the electrode 10 has been detached from the distal end of the shank G1.

After that, the controller 9 controls the first fluid pressure cylinder 3 to extend the first piston rod 3a. The first rotator 6 is then rotated toward the one side in the state where the second rotator 7 stops due to the urging force of the brake mechanism 22, to thereby cause the graspers 8 to turn toward the one side. Then, the one of the inclined faces 8f of each of the graspers 8 contacts the inner circumferential surface of the ring portion 6a to thereby cause the first and second rotators 6, 7 to rotate in an integrated manner toward the one side against the urging force of the brake mechanism 22. As illustrated in FIG. 12, the first and second rotators 6, 7 return to the second detachment starting position P2 and the second relative positional relationship R2. In this instance, the extension portion 7d returns to the location corresponding to the detection sensor 21 by rotating the second rotator 7 toward the one side.

Then, the controller 9 controls the first fluid pressure cylinder 3 to retract the first piston rod 3a. As illustrated in FIG. 13, this retraction of the first piston rod 3a causes the first rotator 6 to rotate toward the other side relative to the second rotator 7 which stops its rotation due to the urging force of the brake mechanism 22, and this rotation of the first rotator 6 causes the graspers 8 to turn toward the other side. Thus, the pawl portions 8c advance into the detachment operation space S1 and then retract from the detachment operation space S1. Then, as illustrated in FIG. 14, the other of the inclined faces 8f of each of the graspers 8 contacts the inner circumferential surface of the ring portion 6a to thereby cause the first and second rotators 6, 7 to rotate in an integrated manner toward the other side against the urging force of the brake mechanism 22. After that, as illustrated in FIG. 15, the first and second rotators 6, 7 are located at the first detachment starting position P1 and in the first relative positional relationship R1, finishing the operations for detaching the pair of electrodes 10 held on the welding gun G. In this instance, while the second rotator 7 is rotated from the second detachment starting position P2 toward the other side, the extension portion 7d remains in the location corresponding to the detection sensor 21.

According to the first embodiment of the present disclosure, after the electrode 10 held on the distal end of the shank G1 is set in the detachment operation space S1 with the first and second rotators 6, 7 being in the first relative positional relationship R1, when the first and second rotators 6, 7 are rotated relative to one another toward the one side, the pawl portions 8c of the graspers 8 advance into the detachment operation space S1 to grasp the electrode 10. When the first rotator 6 is, in that state, rotated further toward the one side, the second rotator 7 is together rotated toward the one side to twist the electrode 10 on the distal end of the shank G1 to detach the electrode 10 from the distal end of the shank G1. In contrast, after the electrode 10 held on the distal end of the shank G1 is set in the detachment operation space S1 with the first and second rotators 6, 7 being in the second relative positional relationship R2, when the first and second rotators 6, 7 are rotated relative to one another toward the other side, the pawl portions 8c of the graspers 8 advance into the detachment operation space S1 to grasp the electrode 10. When the first rotator 6 is, in that state, rotated further toward the other side, the second rotator 7 is together rotated toward the other side to twist the electrode 10 on the distal end of the shank G1 to detach the electrode 10 from the distal end of the shank G1 Thus, even when the electrode 10 is rotated in each of two directions, the one side and the other, on the shank G1, the electrode 10 can be detached from the shank G1. Accordingly, since a direction of rotation of the electrode 10 on the shank G1 is determined to be opposite to a direction of attachment of the shank G1 to the gun body in detachment operations of the electrode 10, for example, unintentional detachment of the shank G1 from the gun body can be avoided.

Then, the plurality of the graspers 8 for detaching the electrode 10 are only arranged in one line around the axis of rotation C1 and there are no sets of the plurality of the graspers 80 provided along the direction of the axis of rotation C1 as in WO2015/118573, thus enabling the electrode disassembly device 1 for spot welding to become compact along the direction of the axis of rotation C1.

Further, the electrode disassembly device 1 for spot welding includes only one set of the graspers where the plurality of the graspers are arranged in one line along the circumferential direction about the axis of rotation C1 and does not include electrode grasping parts provided in a dedicated manner for each electrode to be detached as in WO2015/118573, enabling reduced number of components to have a simpler structure, and lowered cost of the components.

Also, each of the graspers 8 only provides one pawl portion 8c, and thus the pawl portion 8c can be used to grasp the electrode 10 not only when the first and second rotators 6, 7 are rotated toward the one side, but also when the first and second rotators 6, 7 are rotated toward the other side. Thus, the graspers 8 can have a simpler structure and the cost of the components can be reduced.

Moreover, since the second rotator 7 is harder to rotate around the axis of rotation than the first rotator 6 due to the urging force of the coil springs 22c applied to the second rotator 7 in the direction of the axis of rotation C1, the first rotator 6 is rotated relative to the second rotator 7 toward the one side when the first piston rod 3a extends, and the first rotator 6 is rotated relative to the second rotator 7 toward the other side when the first piston rod 3a retracts. Thus, one driving source enables the first and second rotators 6, 7 to be rotated relative to one another to turn the graspers 8 to perform grasp and release of the electrode 10, resulting in the electrode disassembly device 1 for spot welding less costly.

When the second rotator 7 is rotated together with the first rotator 6 toward the one side, the electrode 10 is twisted on the distal end of the shank G1 toward the one side to be detached from the distal end of the shank G1 and the extension portion 7d is located not to correspond to the detection sensor 21. In contrast, when the second rotator 7 is rotated together with the first rotator 6 toward the other side, the electrode 10 is twisted on the distal end of the shank G1 toward the other side to be detached from the distal end of the shank G1 and the extension portion 7d is located not to correspond to the detection sensor 21. Accordingly, regardless of the directions of rotation of the electrode 10 on the distal end of the shank G1, the detachment of the electrode 10 from the distal end of the shank G1 can be sensed from whether the detection sensor 21 detects the extension portion 7d or not.

In the first embodiment of the present disclosure, the first rotator 6 is rotated by using the first fluid pressure cylinder 3; however, the embodiment is not limited to this configuration, the rotation of the first rotator 6 may be performed by using a servomotor having an encoder capable of controlling rotation angles, for example.

In the first embodiment of the present disclosure, the first rotator 6 is rotated relative to the second rotator 7 to grasp the electrode by the graspers 8; however, the second rotator 7 may be rotated relative to the first rotator 6 to grasp the electrode by the graspers 8.

In the first embodiment of the present disclosure, the first fluid pressure cylinder 3 of the type that is driven by supplying and discharging compressed air is used; however, the first fluid pressure cylinder of the type that is driven by supplying and discharging hydraulic oil may be used.

In the first embodiment of the present disclosure, the coil spring 22c is used as an urging means of the brake mechanism 22; however, other urging means can be used and, for example, other types of spring, or an elastic member made from a rubber material can be used.

Second Embodiment of Disclosure

FIGS. 16 to 22 illustrate an electrode disassembly device 1 for spot welding according to a second embodiment of the present disclosure. The second embodiment only differs from the first embodiment in terms of a second fluid pressure cylinder 4 used instead of the brake mechanism 22 and of part of structures of the second rotator 7 and the grasper 8, while being the same as the first embodiment in terms of other aspects. Aspects different from the first embodiment will be only explained in detail below.

In a casing 2 of the second embodiment, screw holes 20 are not provided, nor is a detection sensor 21 attached.

Figure 17:
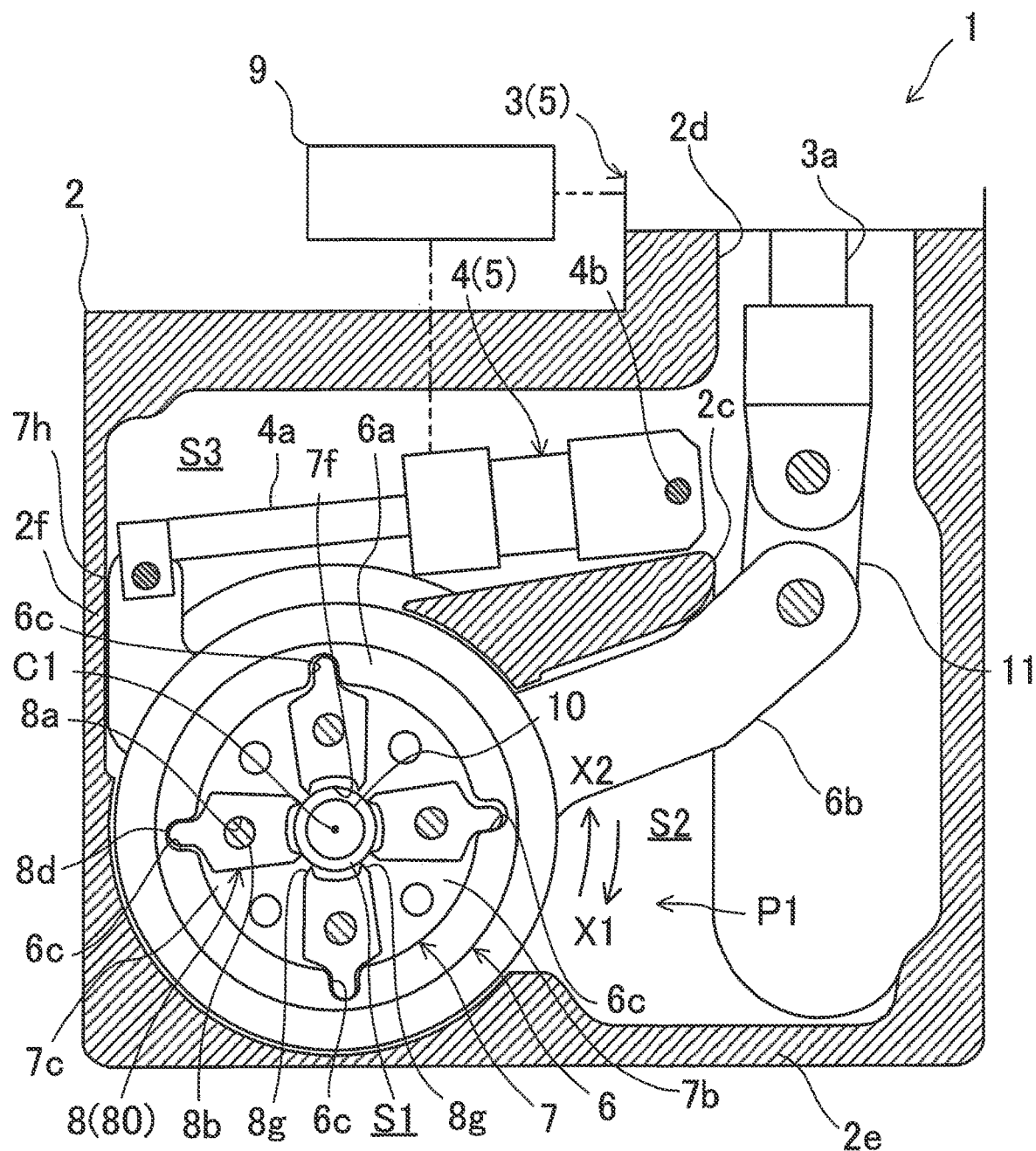
FIG. 17 is a cross-sectional view taken along plane XVII-XVII in FIG. 16.

As illustrated in FIG. 17, in a housing space S3 of the casing 2 of the second embodiment 2, the second fluid pressure cylinder 4 in which a second piston rod 4a extends and retracts toward an upstream side in the direction of the transfer line is disposed, and the second fluid pressure cylinder 4 is chosen to have force of extension and retraction being smaller capacity than that of a first fluid pressure cylinder 3.

The second fluid pressure cylinder 4 has a base end supported on the casing 2 pivotally and swingably via a vertically extending pivot 4b. While the second fluid pressure cylinder 4 swings toward one side to thereby cause the second piston rod 4a to move toward the opposite side to the transfer passage R, the second fluid pressure cylinder 4 swings toward another side to thereby cause the second piston rod 4a to move toward the transfer passage R.

The first fluid pressure cylinder 3 and the second fluid pressure cylinder 4 constitute a drive unit 5 of the second embodiment of present disclosure.

An upper body 7a and a lower body 7b of the second rotator 7 of the second embodiment are vertically symmetrically formed.

The upper body 7a includes a disk portion 7c having a center line aligning with the axis of rotation C1 and a small lever portion 7h extending from an outer peripheral edge of the disk portion 7c toward the opposite side from the transfer passage R, and the small lever portion 7h includes an extension end portion connected to a distal end of the second piston rod 4a.

The lower body 7b has the same structure as the upper body 7a and thus has the same reference numerals as the upper body 7a. A detailed explanation for the lower body 7b is thus omitted.

The upper and lower bodies 7a, 7b are rotated toward the one side (X1 direction) by turning the small lever portions 7h to the one side as the second fluid pressure cylinder 4 swings toward the one side through the retraction of the second piston rod 4a. The upper and lower bodies 7a, 7b are rotated toward the other side (X2 direction) by turning the small lever portions 7h to the other side as the second fluid pressure cylinder 4 swings toward the other side through the extension of the second piston rod 4a.

As illustrated in FIGS. 2 and 4, when turning toward the other side, the small lever portions 7h contact a wall 2f of the casing 2 located upstream in the direction of the transfer line, to stop turning further.

A pair of pawl portions 8g protrude at a distal end of the grasper 8 of the second embodiment toward the detachment operation space S1. The pawl portions 8g are spaced apart from one another in the circumferential direction about the axis of rotation C1.

As illustrated in FIG. 17, a location of the first rotator 6 in the state where the first piston rod 3a of the first fluid pressure cylinder 3 is retracted and a location of the second rotator 7 in the state where the second piston rod 4a of the second fluid pressure cylinder 4 is extended is a first detachment starting position P1 for starting the detachment operations of one (lower) electrode 10. A relative positional relationship of the first rotator 6 and the second rotator 7 at the first detachment starting position P1 is a first relative positional relationship R1 of the present disclosure.

Figure 20:
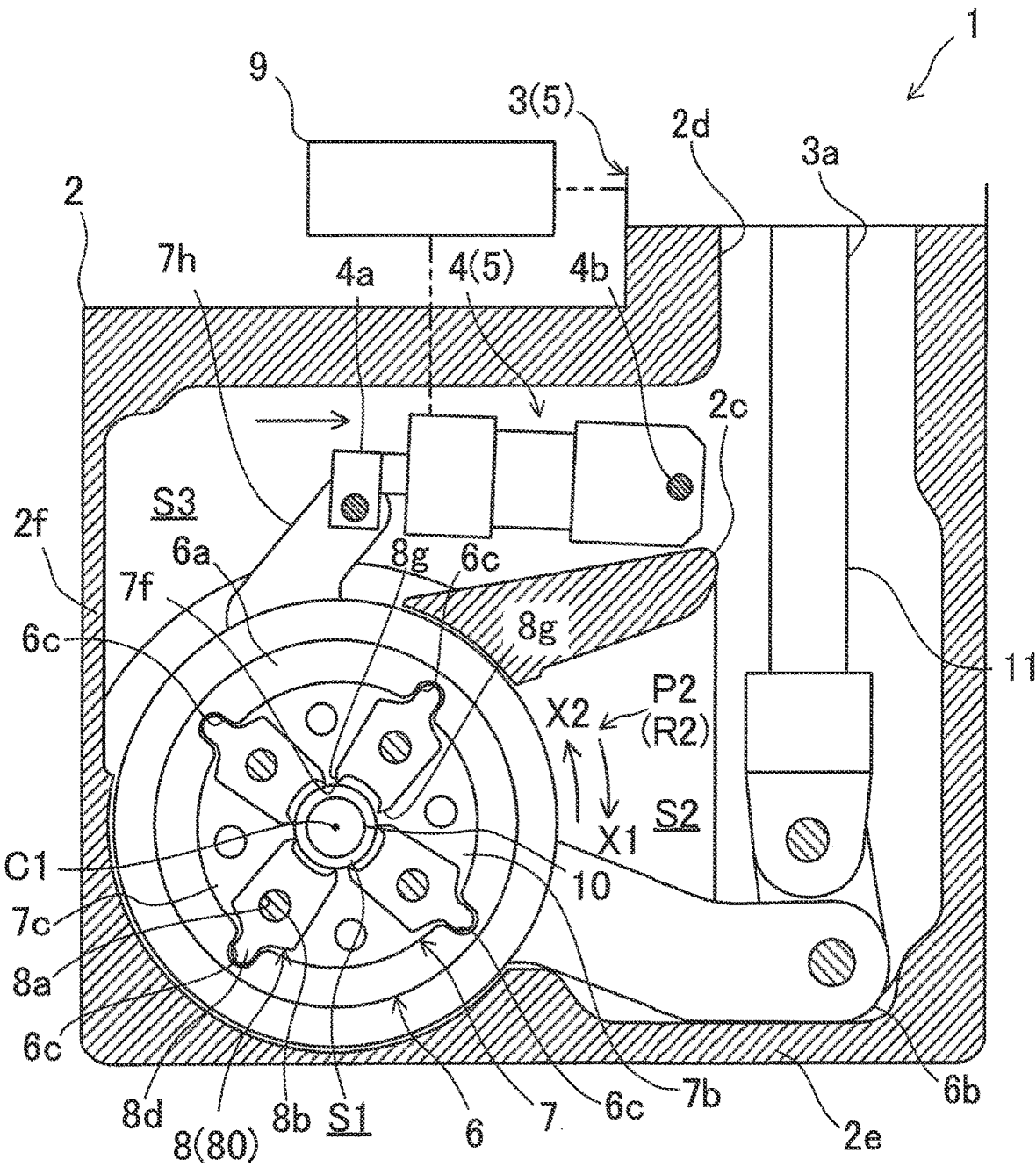
FIG. 20 is a view depicting a state immediately before detaching another electrode from a distal end of a shank after the one electrode is removed from an electrode detachment space following the state illustrated in FIG. 19.

As illustrated in FIG. 20, a location of the first rotator 6 in the state where the first piston rod 3a of the first fluid pressure cylinder 3 is extended and a location of the second rotator 7 in the state where the second piston rod 4a of the second fluid pressure cylinder 4 is retracted is a second detachment starting position P2 for starting the detachment operations of another electrode 10. A relative positional relationship of the first rotator 6 and the second rotator 7 at the second detachment starting position P2 is a second relative positional relationship R2 of the present disclosure.

As a result, the first and second relative positional relationships R1, R2 according to the second embodiment are relative positional relationships in which the positional relationships between the first and second rotators 6, 7 are same.

Figure 18:
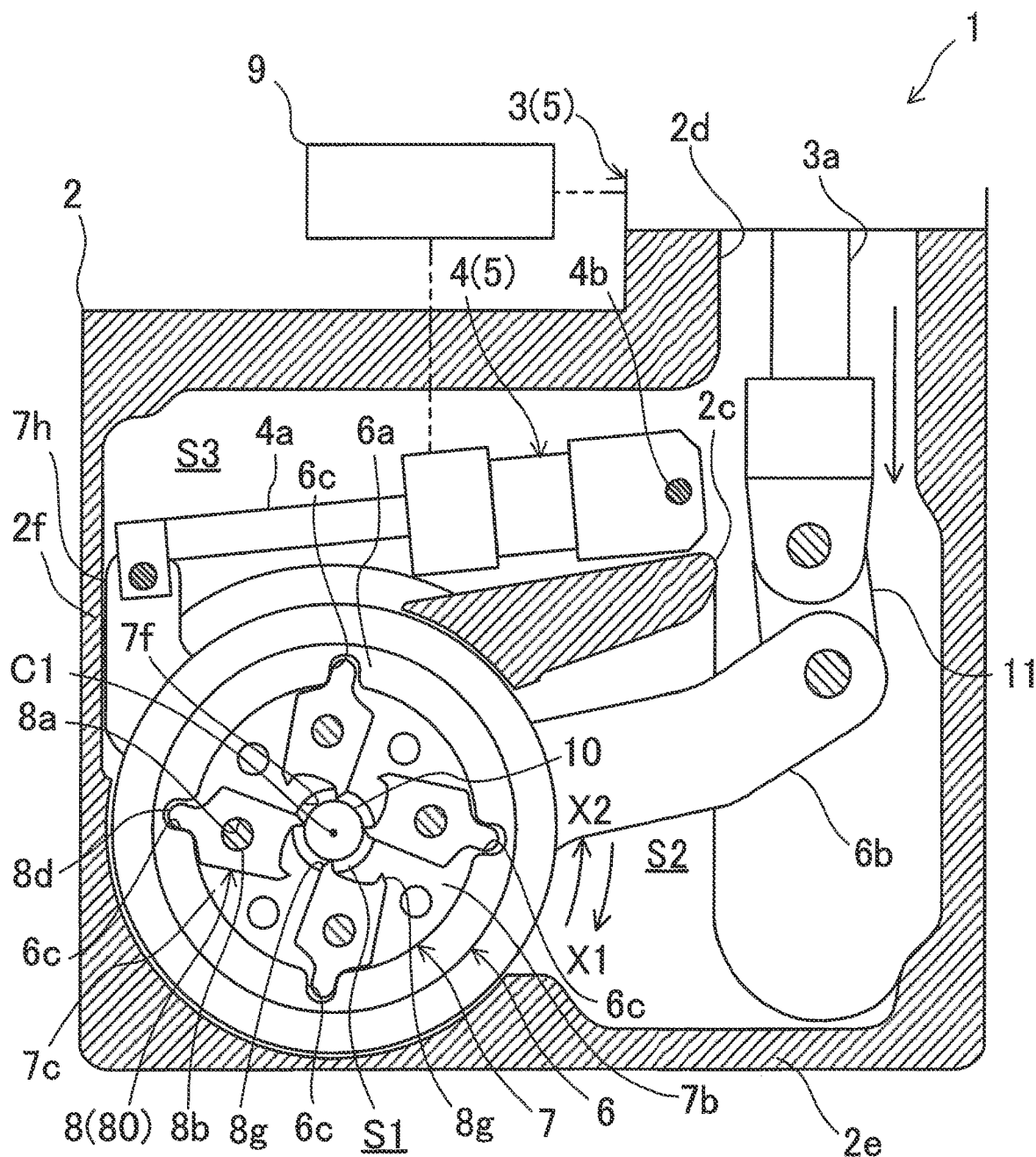
FIG. 18 is a view depicting a state in the midst of detaching one electrode from a distal end of a shank after the state illustrated in FIG. 17.

Then, as illustrated in FIGS. 17 and 18, when the first and second rotators 6, 7 are rotated relative to each other toward the one side at the first detachment starting position P1 and in the first relative positional relationship R1, i.e., when the first rotator 6 is rotated relative to the second rotator 7 toward the one side, fitting portions 6c press respective protrusions 8d toward the one side and thereby the graspers 8 turn toward the one side to cause one of the pair of pawl portions 8g to advance into the detachment operation space S1.

Figure 21:
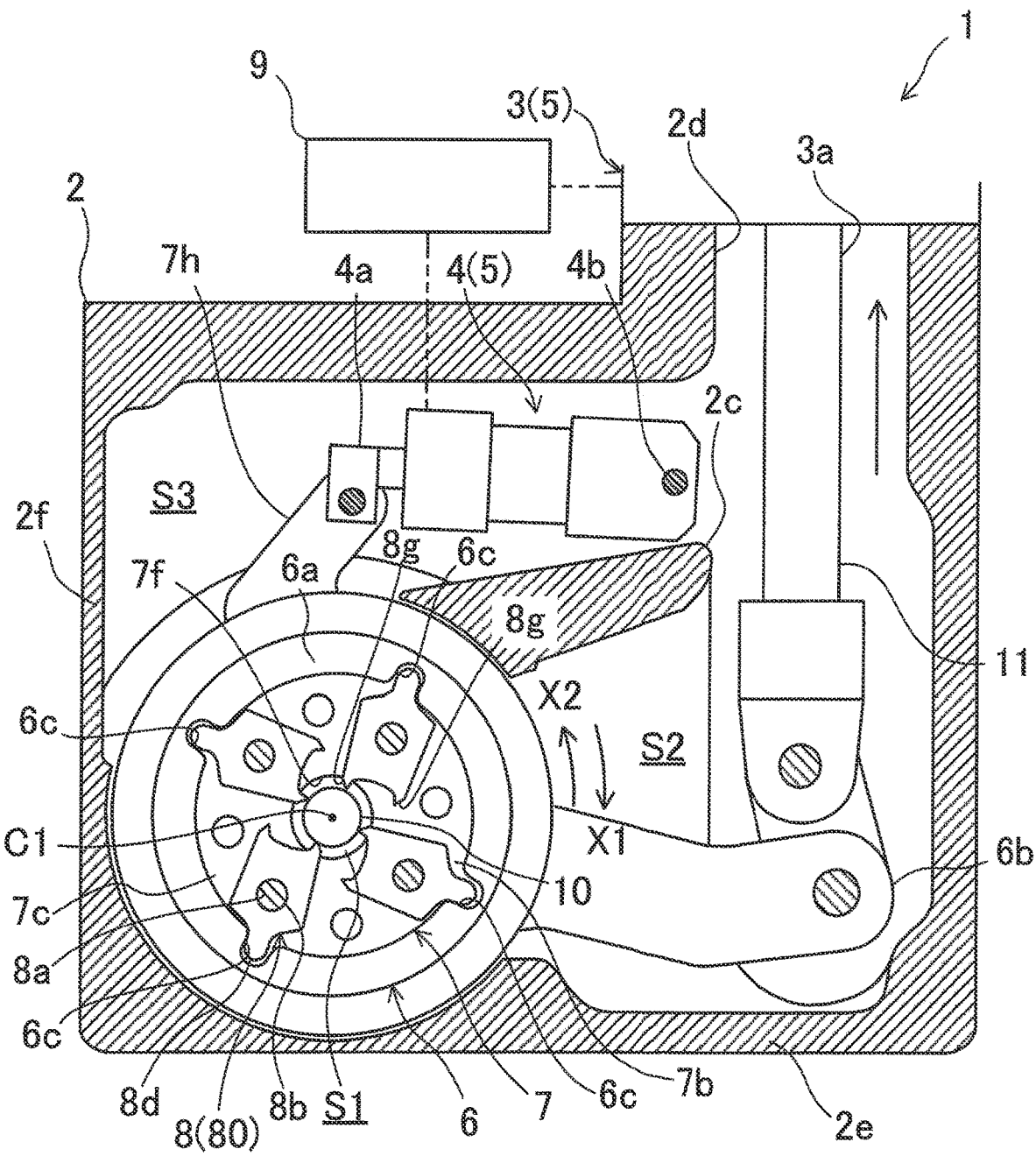
FIG. 21 is a view depicting a state in the midst of detaching the other electrode from the distal end of the shank after the state illustrated in FIG. 20.

In contrast, as illustrated in FIGS. 20 to 21, when the first and second rotators 6, 7 are rotated relative to each other toward the other side at the second detachment starting position P2 and in the second relative positional relationship R2, i.e., when the first rotator 6 is rotated relative to the second rotator 7 toward the other side, the fitting portions 6c press the respective protrusions 8d toward the other side and thereby the graspers 8 turn toward the other side to cause another of the pair of pawl portions 8g to advance into the detachment operation space S1.

A controller 9 of the second embodiment is connected to the second fluid pressure cylinder 4 and outputs an actuation signal to the second fluid pressure cylinder 4 to thereby extend and retract the second piston rod 4a, so that the second rotator 7 is rotated towards the one side or the other side.

When the electrode 10 held on a shank G1 located on a lower side is detached, the controller 9 controls the first and second fluid pressure cylinders 3, 4 to extend both the first and second piston rods 3a, 4a, in the state where the electrode 10 is set in the detachment operation space S1 in which the first and second rotators 6, 7 are at the first detachment starting position P1 and in the first relative positional relationship R1, as illustrated in FIG. 17. Thereby, the first rotator 6 is rotated toward the one side relative to the second rotator 7 which stops its rotation by contacting the small lever portions 7h to the wall 2f, and the pressing of the fitting portions 6c to the protrusions 8d toward the one side causes the graspers 8 to turn toward the one side and the one of the pawl portions 8g of each of the graspers 8 to advance into the detachment operation space S1 so as to bring the one of the pawl portions 8g in contact with the electrode 10. This allows the one of the pawl portions 8g of each of the graspers 8 to grasp the electrode 10, as illustrated in FIG. 18.

Figure 19:
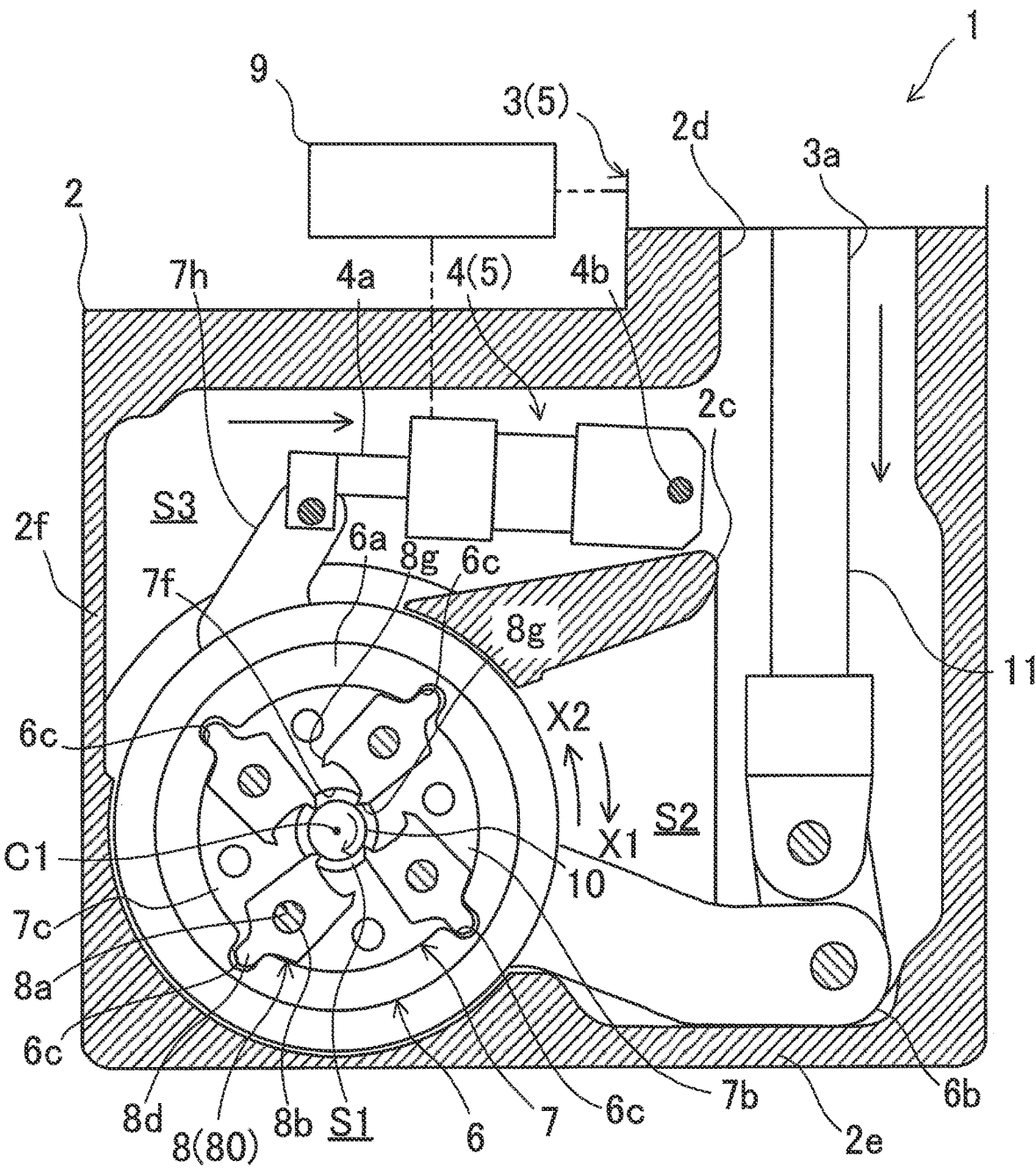
FIG. 19 is a view depicting a state immediately after detaching the one electrode from the distal end of the shank after the state illustrated in FIG. 18.

As illustrated in FIG. 19, the controller 9 then controls the first and second fluid pressure cylinders 3, 4 to continue to extend both the first and second piston rods 3a, 4a, in the state where the electrode 10 is grasped by the one of the pawl portions 8g of each of the graspers 8. Thereby, the first piston rod 3a further extends to overcome force of the extension of the second piston rod 4a and the first and second rotators 6, 7 are thus rotated in an integrated manner together with the electrode 10 toward the one side to detach the electrode 10 from a distal end of the shank G1.

Then, after the lower electrode 10 has been detached from the distal end of the shank G1, the controller 9 controls the first fluid pressure cylinder 3 to extend the first piston rod 3a and also controls the second fluid pressure cylinder 4 to retract the second piston rod 4a. Thereby, the second rotator 7 is rotated toward the one side relative to the first rotator 6 which stops its rotation and the pressing of the fitting portions 6c to the protrusions 8d toward the other side causes the graspers 8 to turn toward the other side. As illustrated in FIG. 20, this causes the one of the pawl portions 8g of each of the graspers 8 to retract from the detachment operation space S1 to remove the electrode 10 from the detachment operation space S1 and the first and second rotators 6, 7 are also located at the second detachment starting position P2 and in the second relative positional relationship R2.

In contrast, when the electrode 10 held on a shank G1 located on an upper side is detached, the controller 9 controls the first and second fluid pressure cylinders 3, 4 to retract both the first and second piston rods 3a, 4a, in the state where the electrode 10 is set in the detachment operation space S1 in which the first and second rotators 6, 7 are at the second detachment starting position P2 and in the second relative positional relationship R2, as illustrated in FIG. 20. Thereby, the first rotator 6 is rotated toward the other side relative to the second rotator 7 which stops its rotation by locating the second piston rod 4a at a retraction end, and the pressing of the fitting portions 6c to the protrusions 8d toward the other side causes the graspers 8 to turn toward the other side and causes the other of the pawl portions 8g of each of the graspers 8 to advance into the detachment operation space S1 so as to bring the other of the pawl portions 8g in contact with the electrode 10. This allows the other of the pawl portions 8g of each of the graspers 8 to grasp the electrode 10, as illustrated in FIG. 21.

Figure 22:
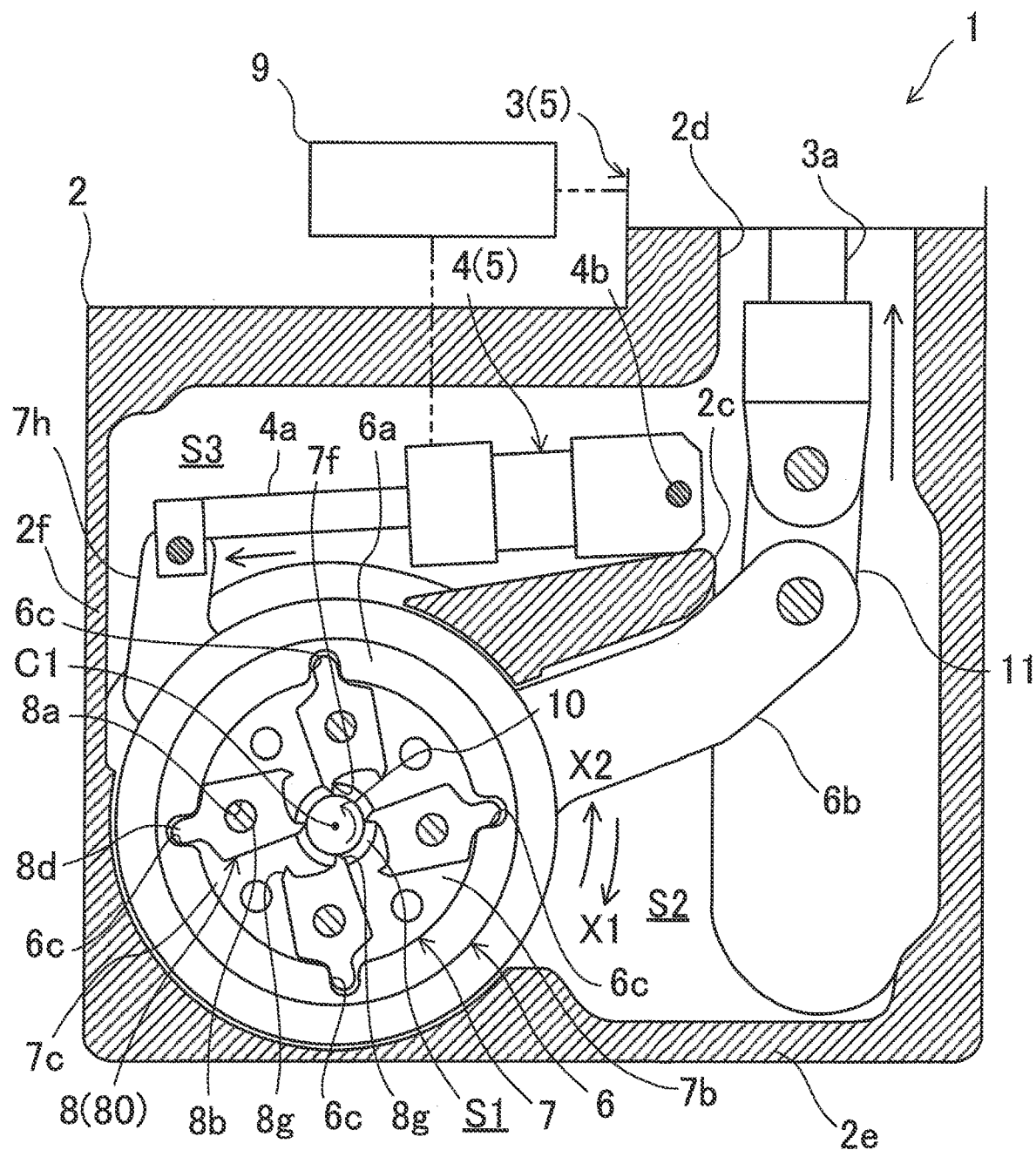
FIG. 22 is a view depicting a state immediately after detaching the other electrode from the distal end of the shank after the state illustrated in FIG. 21.

Then, as illustrated in FIG. 22, the controller 9 controls the first and second fluid pressure cylinders 3, 4 to continue to retract the first and second piston rods 3a, 4a, in the state where the electrode 10 is grasped by the other of the pawl portions 8g of each of the graspers 8. Thereby, the first piston rod 3a further retracts to overcome force of the retraction of the second piston rod 4a and the first and second rotators 6, 7 are thus rotated in an integrated manner together with the electrode 10 toward the other side to detach the electrode 10 from a distal end of the shank G1.

Then, after the upper electrode 10 has been detached from the distal end of the shank G1, the controller 9 controls the first fluid pressure cylinder 3 to retract the first piston rod 3a and also controls the second fluid pressure cylinder 4 to extend the second piston rod 4a. Thereby, the second rotator 7 is rotated toward the other side relative to the first rotator 6 which stops its rotation and the pressing of the fitting portions 6c to the protrusions 8d toward the one side causes the graspers 8 to turn toward the one side. As illustrated in FIG. 17, this causes the other of the pawl portions 8g of each of the graspers 8 to retract from the detachment operation space S1 to remove the electrode 10 from the detachment operation space S1 and the first and second rotators 6, 7 are also located at the first detachment starting position P1 and in the first relative positional relationship R1.

Next, operations for detaching a pair of electrodes held on a welding gun G by using the electrode disassembly device 1 for spot welding according to the second embodiment are described in detail.

First, the welding gun G is moved to set a lower electrode 10 in the detachment operation space S1 from below in the state where the first and the second rotators 6, 7 are at the first detachment starting position P1 and in the first relative positional relationship R1, as illustrated in FIG. 17. After that, the controller 9 controls the first and second fluid pressure cylinders 3, 4 to extend the first and second piston rods 3a, 4a, respectively. The second rotator 7 then stops its rotation by contacting the small lever portions 7h to the wall 2f and the first rotator 6 is rotated toward one side relative to the second rotator 7, to cause the fitting portions 6c to press the respective protrusions 8d of the graspers 8 toward the one side. The graspers 8, the protrusions 8d of which are pressed toward the one side, turn toward the one side, and thus the one of the pawl portions 8g of each of the graspers 8 advances into the detachment operation space S1 to contact the electrode 10 for grasping the electrode 10, as illustrated in FIG. 18.

After the one of the pawl portions 8g of each of the graspers 8 has grasped the electrode 10, the controller 9 controls the first and second fluid pressure cylinders 3, 4 to continue to extend the first and second piston rods 3a, 4a. As illustrated in FIG. 19, the first piston rod 3a then extends to overcome force of the extension of the second piston rod 4a and the first and second rotators 6, 7 are rotated in an integrated manner together with the electrode 10 toward the one side to detach the electrode 10 from a distal end of a shank G1.

Then, after the lower electrode 10 has been detached from the distal end of the shank G1, the controller 9 controls the first fluid pressure cylinder 3 to extend the first piston rod 3a and also controls the second fluid pressure cylinder 4 to retract the second piston rod 4a. The second rotator 7 is then rotated toward the one side relative to the first rotator 6 which stops its rotation by contacting the large lever portion 6b to the wall 2e, to cause the graspers 8 to turn toward the other side. Then, as illustrated in FIG. 20, the one of pawl portions 8g of each of the graspers 8 retracts from the detachment operation space S1 to remove the electrode 10 from the detachment operation space S1 and the first and second rotators 6, 7 are located at the second detachment starting position P2 and in the second relative positional relationship R2.

Then, the welding gun G is moved to set an upper electrode 10 in the detachment operation space S1 from above and thereafter, the controller 9 controls the first and second fluid pressure cylinders 3, 4 to retract the first and second piston rods 3a, 4a, respectively, as illustrated in FIG. 20. The first rotator 6 is then rotated toward the other side relative to the second rotator 7 which stops its rotation by locating the second piston rod 4a at a retraction end, to cause the fitting portions 6c to press the respective protrusions 8d of the graspers 8 toward the other side. The graspers 8, the protrusions 8d of which are pressed toward the other side, turn toward the other side, and thus the other of the pawl portions 8g of each of the graspers 8 advances into the detachment operation space S1 to contact the electrode 10 for grasping the electrode 10, as illustrated in FIG. 21.

When the other of the pawl portions 8g of each of the graspers 8 has grasped the electrode 10, the controller 9 controls the first and second fluid pressure cylinders 3, 4 to continue to retract the first and second piston rods 3a, 4a. As illustrated in FIG. 22, the first piston rod 3a then retracts to overcome force of the retraction of the second piston rod 4a and the first and second rotators 6, 7 are rotated in an integrated manner together with the electrode 10 toward the other side to detach the electrode 10 from a distal end of a shank G1.

Then, after the upper electrode 10 has been detached from the distal end of the shank G1, the controller 9 controls the first fluid pressure cylinder 3 to retract the first piston rod 3a and also controls the second fluid pressure cylinder 4 to extend the second piston rod 4a. The second rotator 7 is then rotated toward the other side relative to the first rotator 6 which stops its rotation by contacting the rotation regulating wall 2c, to cause the graspers 8 to turn toward the one side. As illustrated in FIG. 17, the other of pawl portions 8g of each of the graspers 8 retracts from the detachment operation space S1 to remove the electrode 10 from the detachment operation space S1 and the first and second rotators 6, 7 are located at the first detachment starting position P1 and in the first relative positional relationship R1, finishing the operations for detaching the pair of electrodes 10 held on the welding gun G.

According to the second embodiment of the present disclosure, when the first and second rotators 6, 7 are rotated toward the one side to detach the electrode 10 from the distal ends of the shanks G1 and toward the other side to detach the electrode 10 from the distal ends of the shanks G1, the electrodes 10 are grasped by the different pawl portions 8g of one grasper 8. Thus, the load applied to each of the pawl portions 8g of the grasper 8 when the detachment operations for the electrode 10 are repeated can be the half, resulting in the electrode disassembly device 1 for spot welding less susceptible to breakage of the pawl portions 8g.

Since the first and second piston rods 3a, 4a each extend and retract to thereby rotate the first and second rotators 6, 7 relative to one another, the graspers 8 can turn to perform grasp and release of the electrode 10.

For detaching the electrode 10 from the shank G1, when the first and second piston rods 3a, 4a both extend or retract in the state where the electrode 10 is set in the detachment operation space, the first and second rotators 6, 7 are subjected to relative force in a rotation direction to cause the graspers 8 to grasp the electrode 10, and since the force of the extension and retraction of the second piston rod 4a is smaller than that of the first piston rod 3a, the first piston rod 3a extends or retracts to overcome the force of the extension or retraction of the second piston rod 4a. Thus, the first and second rotators 6, 7 are rotated in an integrated manner with the electrode 10 being firmly grasped by graspers 10, enabling ensured detachment of the electrode 10 from the distal end of the shank G1. Accordingly, the relative and integrated rotation of the first and the second rotators 6, 7 can be only performed by extending and retracting the first and second piston rods 3a, 4a of two of the first and second fluid pressure cylinders 3, 4. This enables the electrode disassembly device 1 for spot welding to be constructed from less costly components and thus cost of the electrode disassembly device 1 for spot welding can be further lowered.

In the second embodiment of the present disclosure, the first and second rotators 6, 7 are rotated by using the first and second fluid pressure cylinders 3, 4, respectively; however, the embodiment is not limited to this configuration, and the relative and integrated rotation of the first and second rotators 6, 7 may be performed by using servomotors having an encoder capable of controlling rotation angles, for example.

In the second embodiment of the present disclosure, the first and second fluid pressure cylinders 3, 4 of the type that is driven by supplying and discharging compressed air are used; however, the first and second fluid pressure cylinders of the type that is driven by supplying and discharging hydraulic oil may be used.

In the second embodiment of the present disclosure, the pair of the pawl portions 8g are provided in the grasper 8 and the first and second relative positional relationships R1, R2 of the first and second rotators 6, 7 are the same relative positional relationship; however, one pawl portion 8g may be only provided in the grasper 8 and the first and second relative positional relationships R1, R2 of the first and second rotators 6, 7 may be different relative positional relationships.

Further, in the first embodiment of the present disclosure, one pawl portion 8c is only provided in the grasper 8 and the first and second relative positional relationships R1, R2 of the first and second rotators 6, 7 are different relative positional relationships; however, as in the second embodiment, a pair of pawl portions 8c may be provided in the grasper 8 and the first and second relative positional relationships R1, R2 of the first and second rotators 6, 7 may be the same relative positional relationship.

The present disclosure is suitable for an electrode disassembly device for spot welding for use in automobile production lines.

The invention claimed is:

1. An electrode disassembly device for detaching an electrode held on a distal end of a shank of a gun for spot welding, from the distal end of the shank, comprising:
  a first rotator having an axis of rotation located at a center of a detachment operation space, and including a plurality of fitting portions at equal intervals around the axis of rotation;
  a second rotator configured to be rotatable with respect to the first rotator around the axis of rotation;
  a drive unit configured to rotate at least one of the first rotator and the second rotator; and
  a plurality of graspers disposed at locations corresponding to the respective fitting portions, and each supported on the second rotator pivotally and rotatably around a shaft extending in a same direction as the axis of rotation, the plurality of graspers each having a distal end portion including a pawl portion, and a base portion configured to be fitted into a corresponding fitting portion,
  wherein upon setting in the detachment operation space the electrode being held on the distal end of the shank of the gun for spot welding, when the drive unit drives to rotate the first rotator and the second rotator relative to one another in a first relative positional relationship to move the first rotator with respect to the second rotator in a clockwise direction about the axis of rotation, the fitting portions press the respective base portions in a tangential direction corresponding to the clockwise direction and thereby the graspers turn in the clockwise direction to cause the respective pawl portions to advance into the detachment operation space such that the pawl portions can contact the electrode, and when the drive unit drives to rotate the first rotator and the second rotator relative to one another in a second relative positional relationship to move the first rotator with respect to the second rotator in a counterclockwise direction about the axis of rotation, the fitting portions press the respective base portions in a tangential direction corresponding to the counterclockwise direction and thereby the graspers in the counterclockwise direction to cause the respective pawl portions to advance into the detachment operation space such that the pawl portions can contact the electrode;
  wherein the drive unit includes:
  a first fluid pressure cylinder including a first piston rod having a distal end connected to the first rotator, the first fluid pressure cylinder configured to rotate the first rotator in the clockwise direction about the axis of rotation by extending the first piston rod and to rotate the first rotator in the counterclockwise direction about the axis of rotation by retracting the first piston rod; and
  a brake mechanism including a brake body movable along the axis of rotation and an urging means configured to urge the brake body toward the second rotator to bring the brake body in sliding contact with the second rotator.

2. The device according to claim 1, wherein the first relative positional relationship and the second relative positional relationship are relative positional relationships in which positional relationships between the first rotator and the second rotator differ, and
  wherein each pawl portion includes one pawl portion formed in the respective grasper, and is configured such that when the first rotator is rotated with respect to the second rotator in the clockwise direction about the axis of rotation to shift the first rotator from the first relative positional relationship to the second relative positional relationship, the graspers turn in the clockwise direction to cause the respective pawl portions to advance into the detachment operation space and then to retract from the detachment operation space, and when the first rotator is rotated with respect to the second rotator in the counterclockwise direction about the axis of rotation to shift the first rotator from the second relative positional relationship to the first relative positional relationship, the graspers turn in the counterclockwise direction to cause the respective pawl portions to advance into the detachment operation space and then to retract from the detachment operation space.

3. The device according to claim 1, wherein the second rotator includes an extension portion extending laterally outwardly,
  a detection sensor capable of detecting the extension portion is provided laterally outwardly of the second rotator, and
  the second rotator is configured such that the extension portion is located to correspond to the detection sensor in the state where the first rotator and the second rotator are in the first relative positional relationship and the second relative positional relationship, and the extension portion is located not to correspond to the detection sensor in the state where the electrode has been detached from the distal end of the shank by rotating the second rotator in the clockwise or counterclockwise direction about the axis of rotation.

* * * * *